(12) United States Patent
Shapiro

(10) Patent No.: US 8,413,344 B2
(45) Date of Patent: Apr. 9, 2013

(54) GEAR ACTUATED ANGLE MEASUREMENT TOOL

(76) Inventor: Marc Lev Shapiro, Alexandria, VA (US)

( * ) Notice: Subject to any disclaimer, the term of this patent is extended or adjusted under 35 U.S.C. 154(b) by 171 days.

(21) Appl. No.: 12/833,786

(22) Filed: Jul. 9, 2010

(65) Prior Publication Data

US 2011/0005093 A1 Jan. 13, 2011

Related U.S. Application Data

(63) Continuation of application No. 12/076,471, filed on Mar. 19, 2008, now Pat. No. 7,752,765.

(51) Int. Cl.
*G01B 3/56* (2006.01)
*F16H 1/02* (2006.01)

(52) U.S. Cl. .............................. 33/471; 33/1 N

(58) Field of Classification Search ............ 33/471, 33/1 N, 453, 463, 495, 496, 497, 498, 499, 33/500; 74/412 R, 413, 414, 415, 435, 504, 74/507, 508, 509, 490.05, 490.1, 490.12, 74/490.13, 490.14, 490.15, DIG. 7
See application file for complete search history.

(56) References Cited

U.S. PATENT DOCUMENTS

| | | |
|---|---|---|
| 715,897 A | 12/1902 | Streed |
| 718,396 A | 1/1903 | Smith |
| 1,540,699 A * | 6/1925 | McMullen ................. 74/421 R |
| 1,655,887 A | 1/1928 | Jerome |
| 1,669,258 A | 5/1928 | Matt |
| 2,718,063 A | 9/1955 | Ike |
| 4,513,512 A | 4/1985 | Fischer |
| 5,209,134 A * | 5/1993 | Nguyen et al. ................. 74/437 |
| 5,887,494 A * | 3/1999 | Papandreou ................. 81/57.29 |
| 6,477,782 B1 * | 11/2002 | Howe .............................. 33/455 |
| 7,047,659 B2 | 5/2006 | Holland |
| 7,296,492 B2 * | 11/2007 | Marine et al. ................... 74/435 |
| 2004/0154176 A1 | 8/2004 | Montenegro et al. |
| 2005/0011296 A1 * | 1/2005 | Koseki ....................... 74/490.05 |
| 2010/0005918 A1 * | 1/2010 | Mizuno et al. ............ 74/490.03 |

FOREIGN PATENT DOCUMENTS

| | | | |
|---|---|---|---|
| GB | 2362961 A | * | 12/2001 |
| GB | 2368917 A | | 5/2002 |
| JP | 2000237985 A | * | 9/2000 |

\* cited by examiner

*Primary Examiner* — R. A Smith
(74) *Attorney, Agent, or Firm* — Fish & Richardson P.C.

(57) ABSTRACT

A multiple gear driver having first and second fixed gears and first and second rotatable gears, the first fixed and rotatable gears located on a first member, and the second fixed and rotatable gears located on a second member, the first and second fixed gears having a common axis so that the first fixed gear drives the second rotatable gear and the second fixed gear drives the first rotatable gears when the first and second member are moved relative to each other.

1 Claim, 23 Drawing Sheets

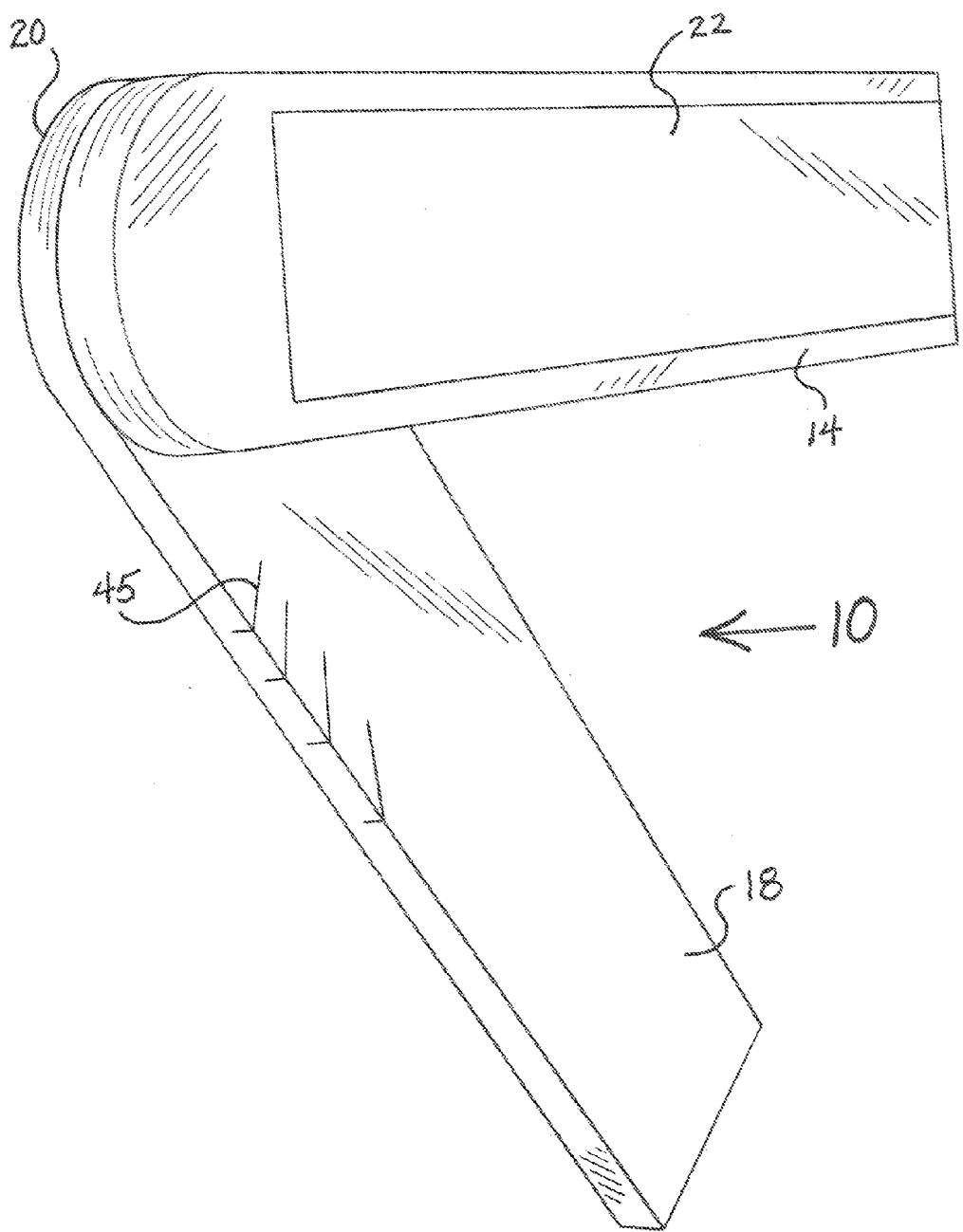

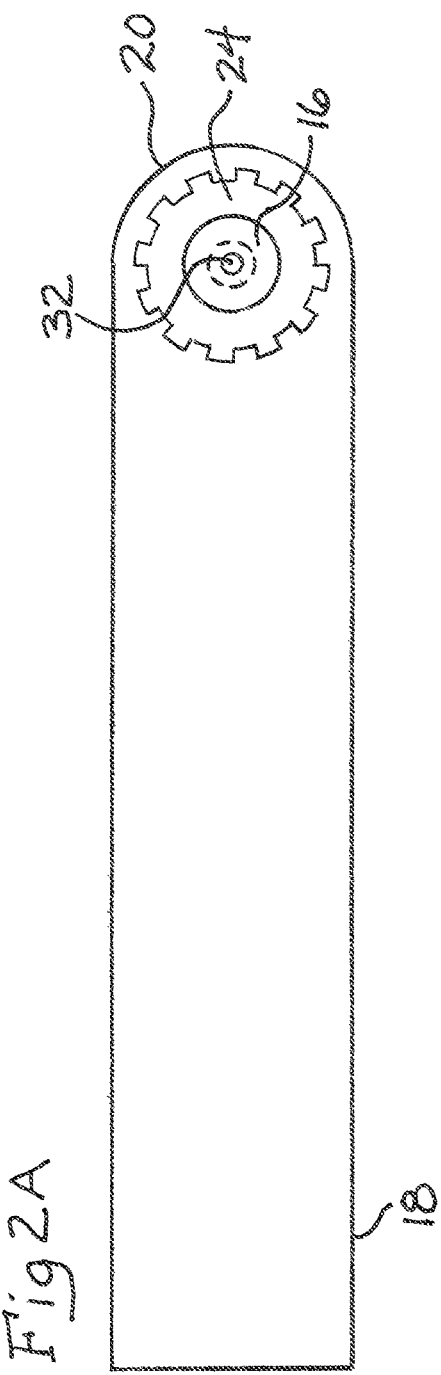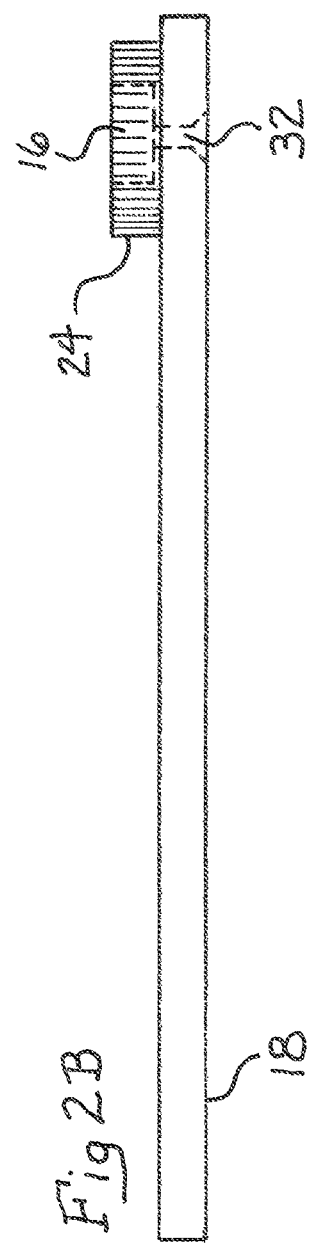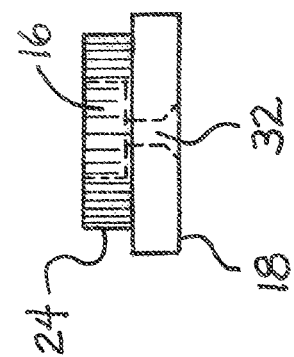

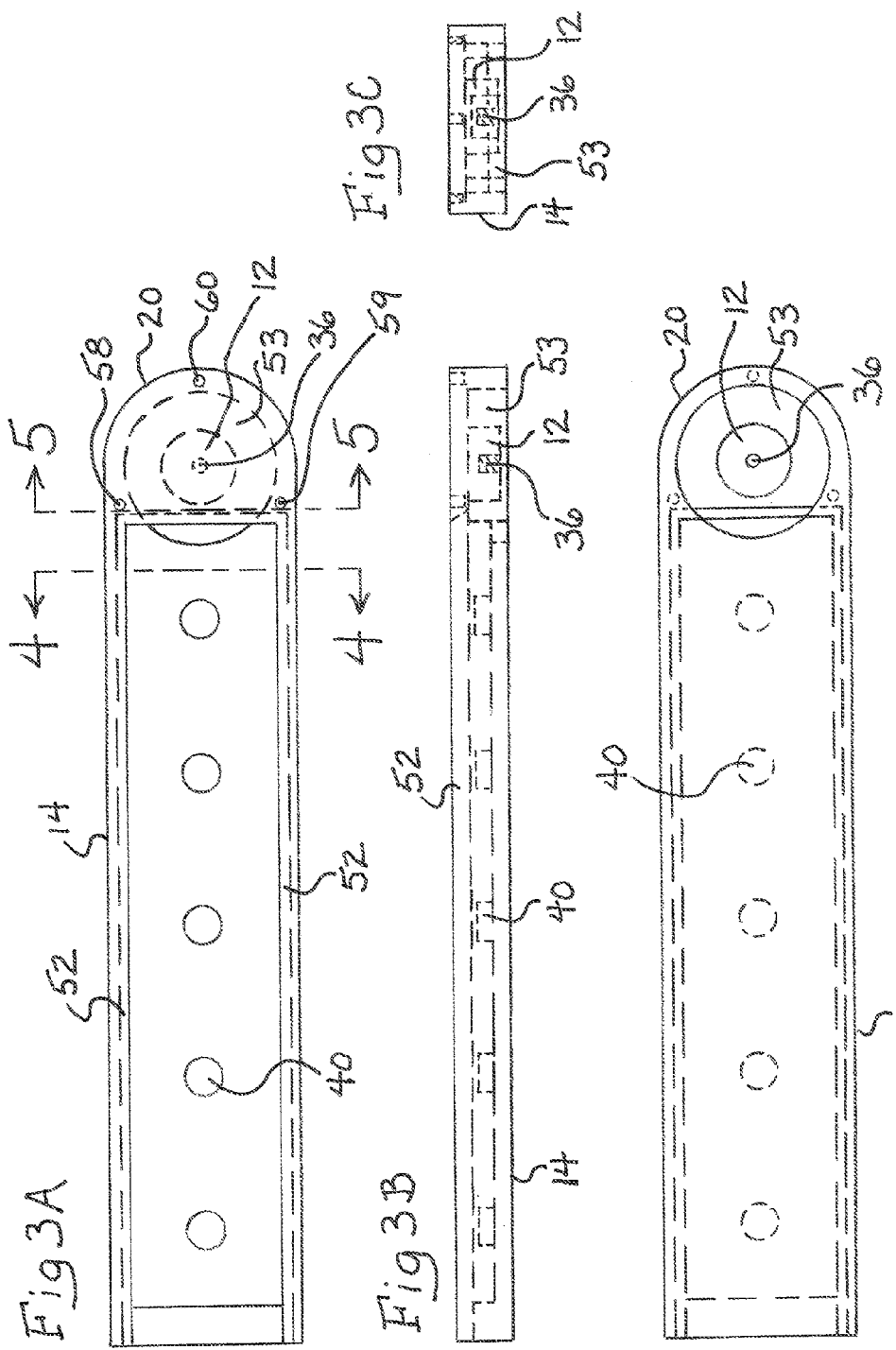

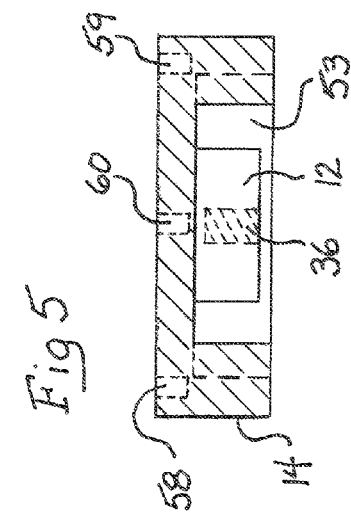
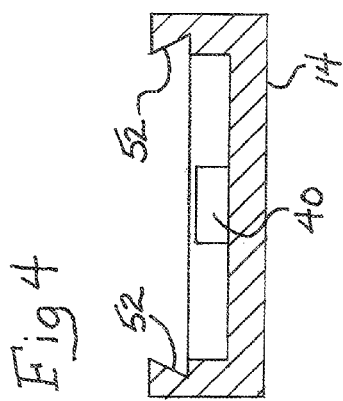
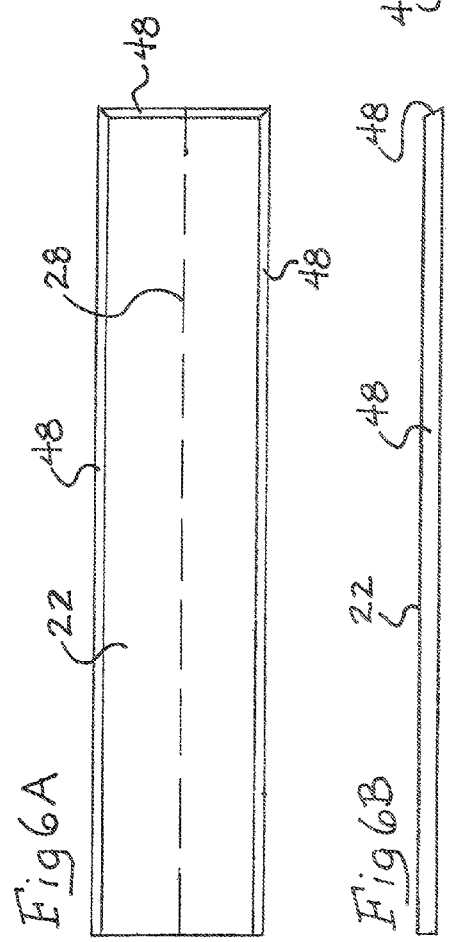

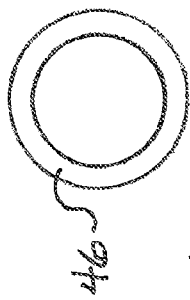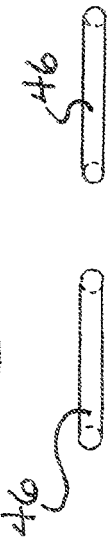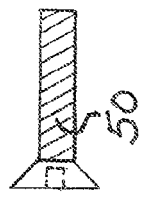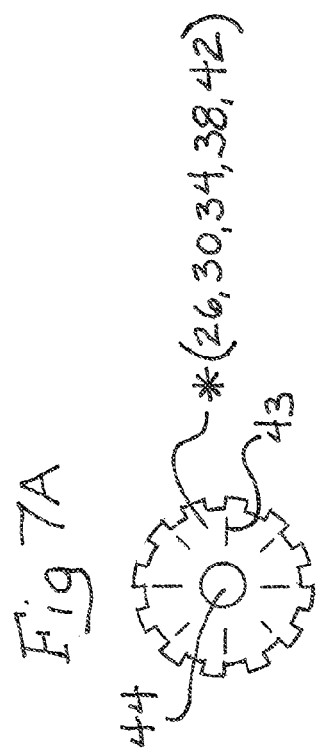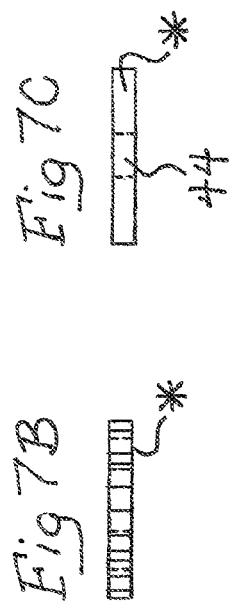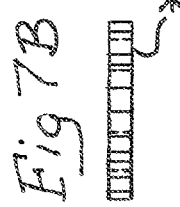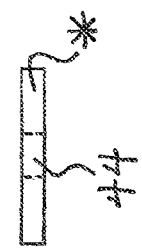

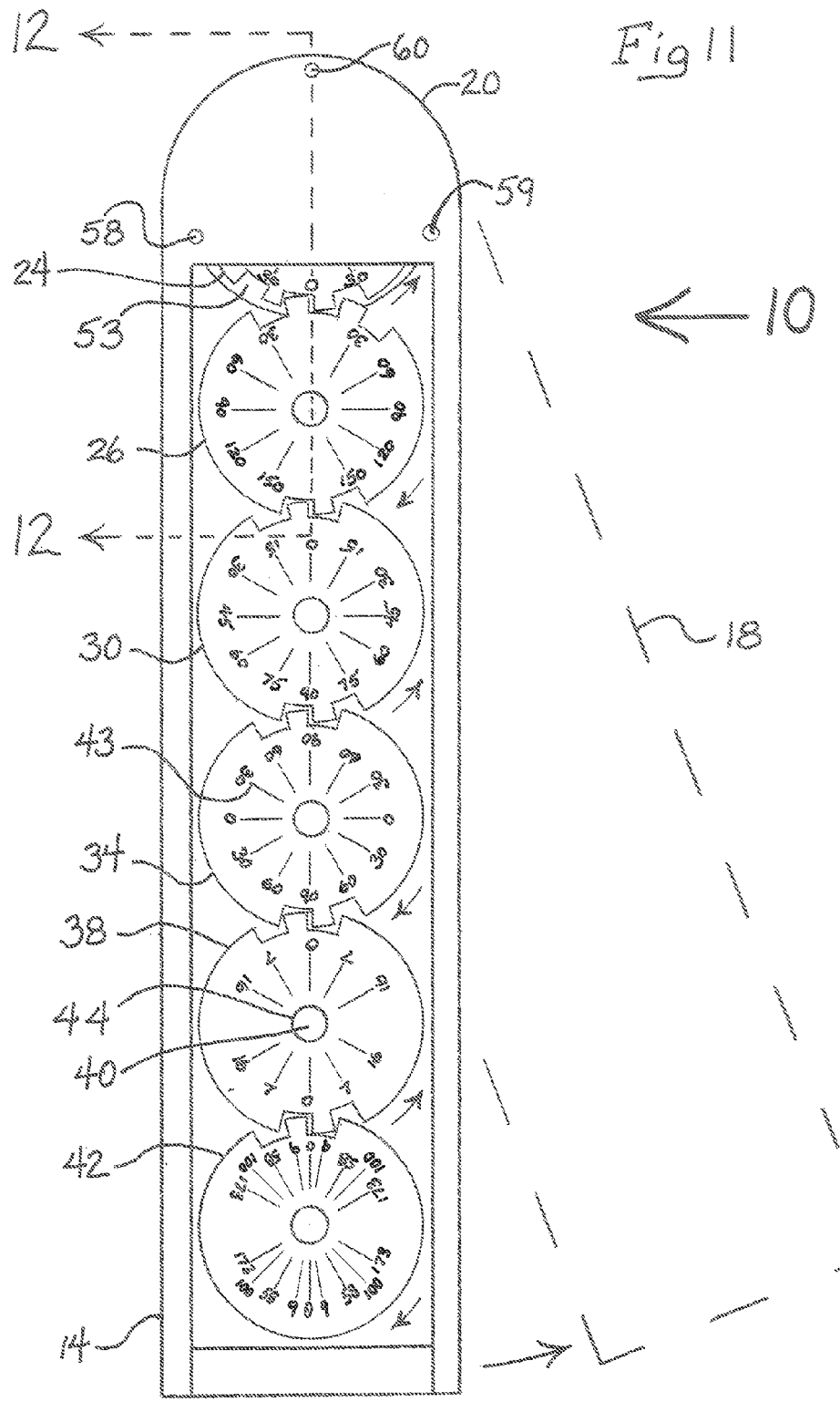

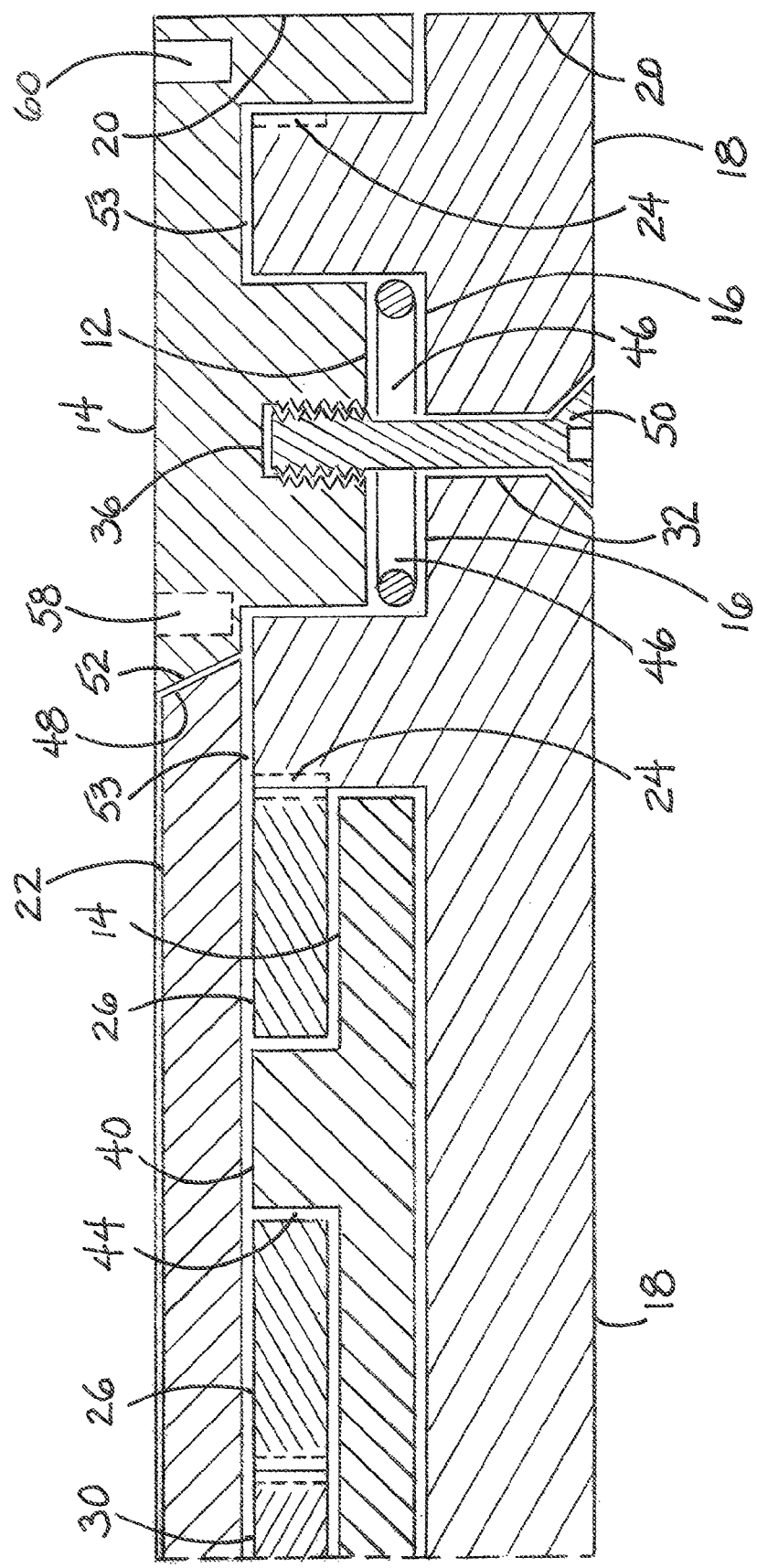

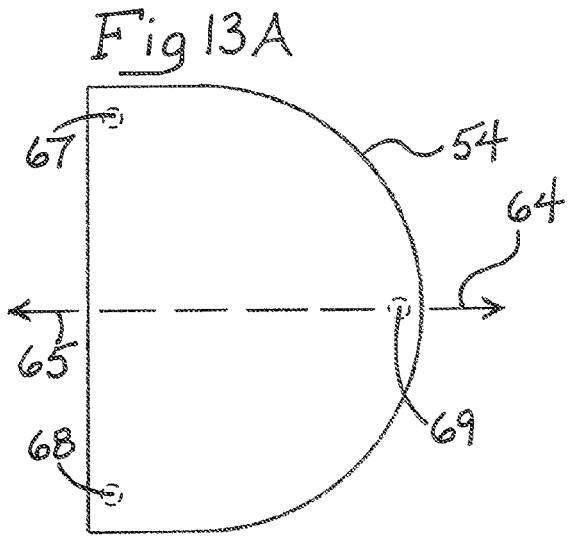
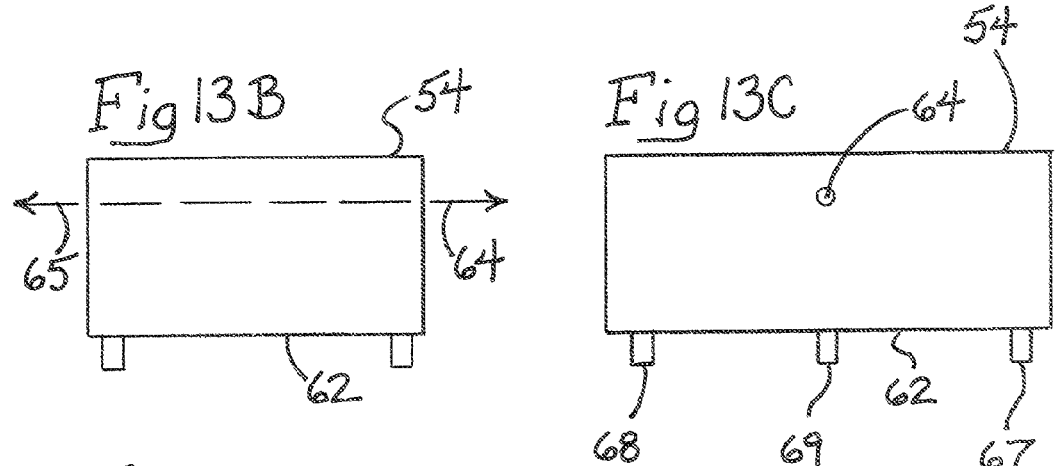
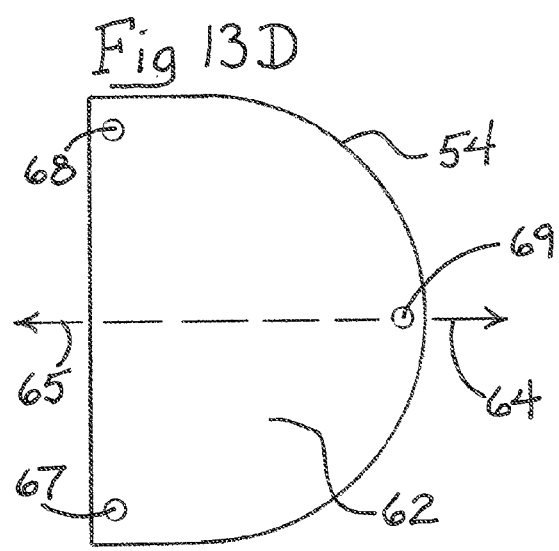

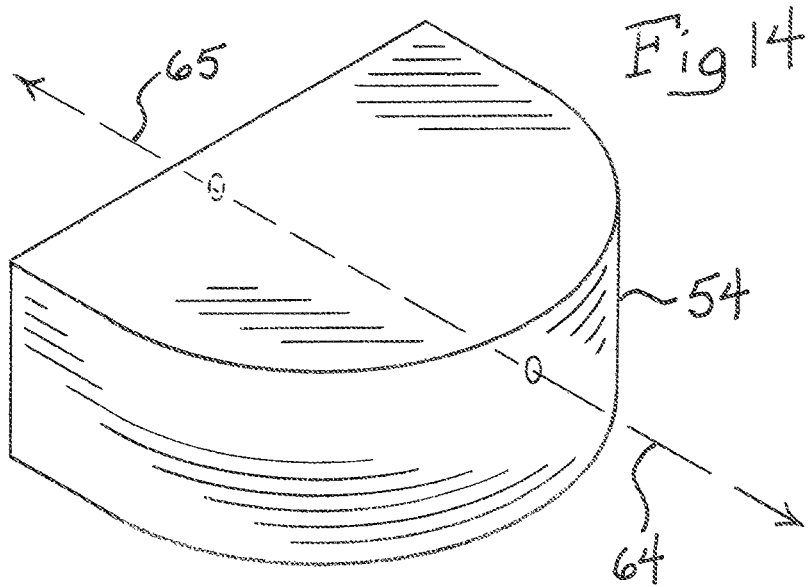
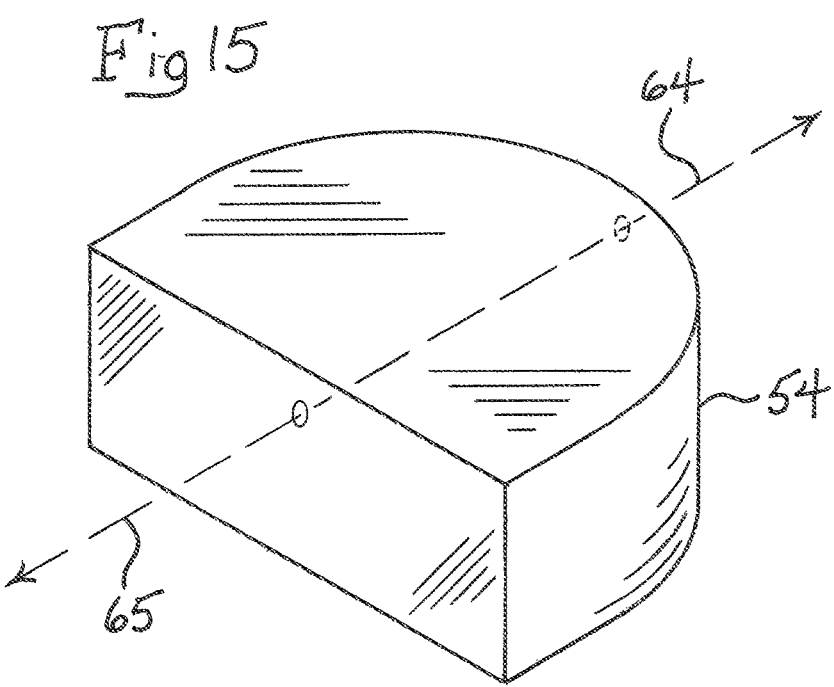

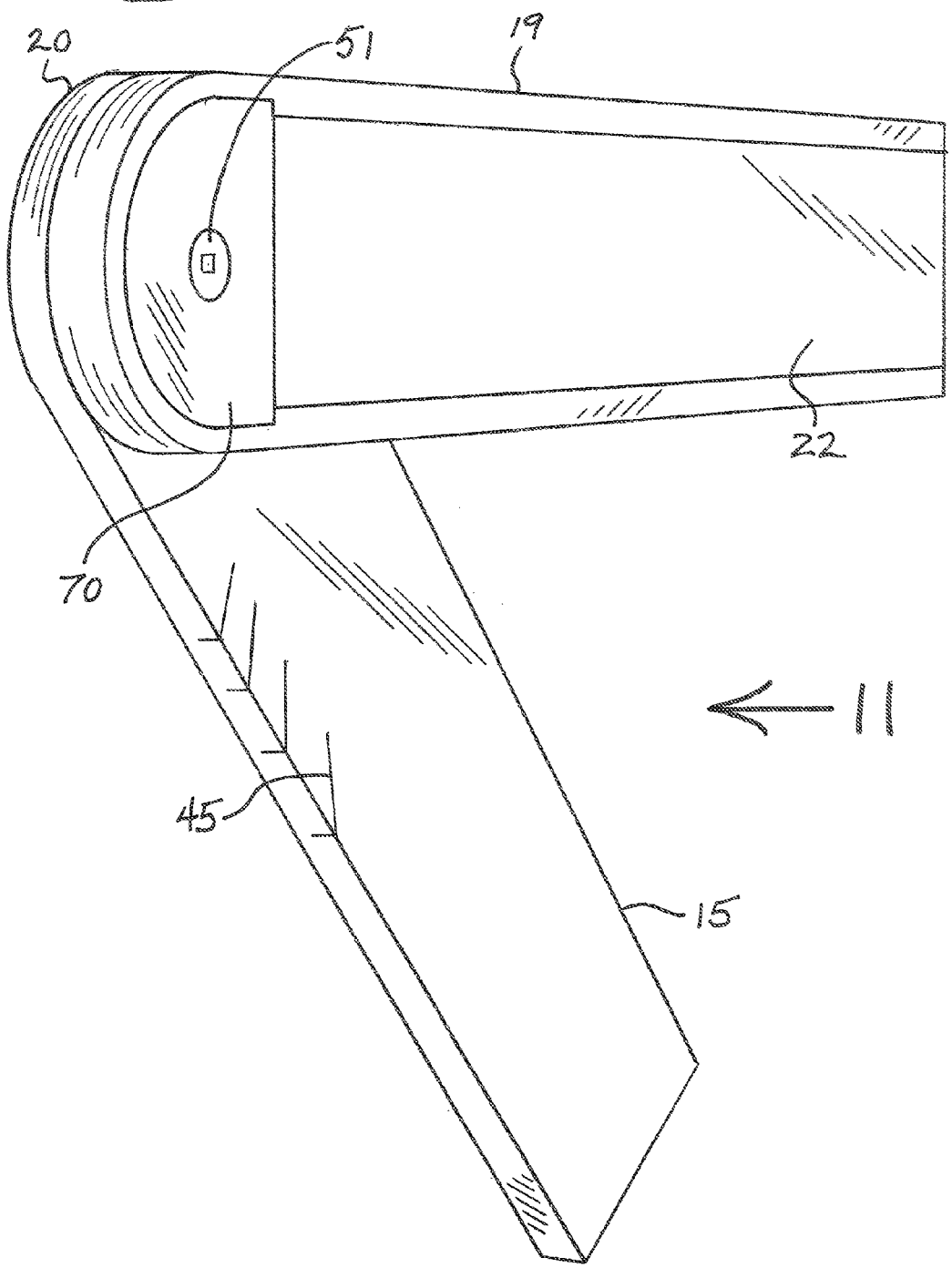

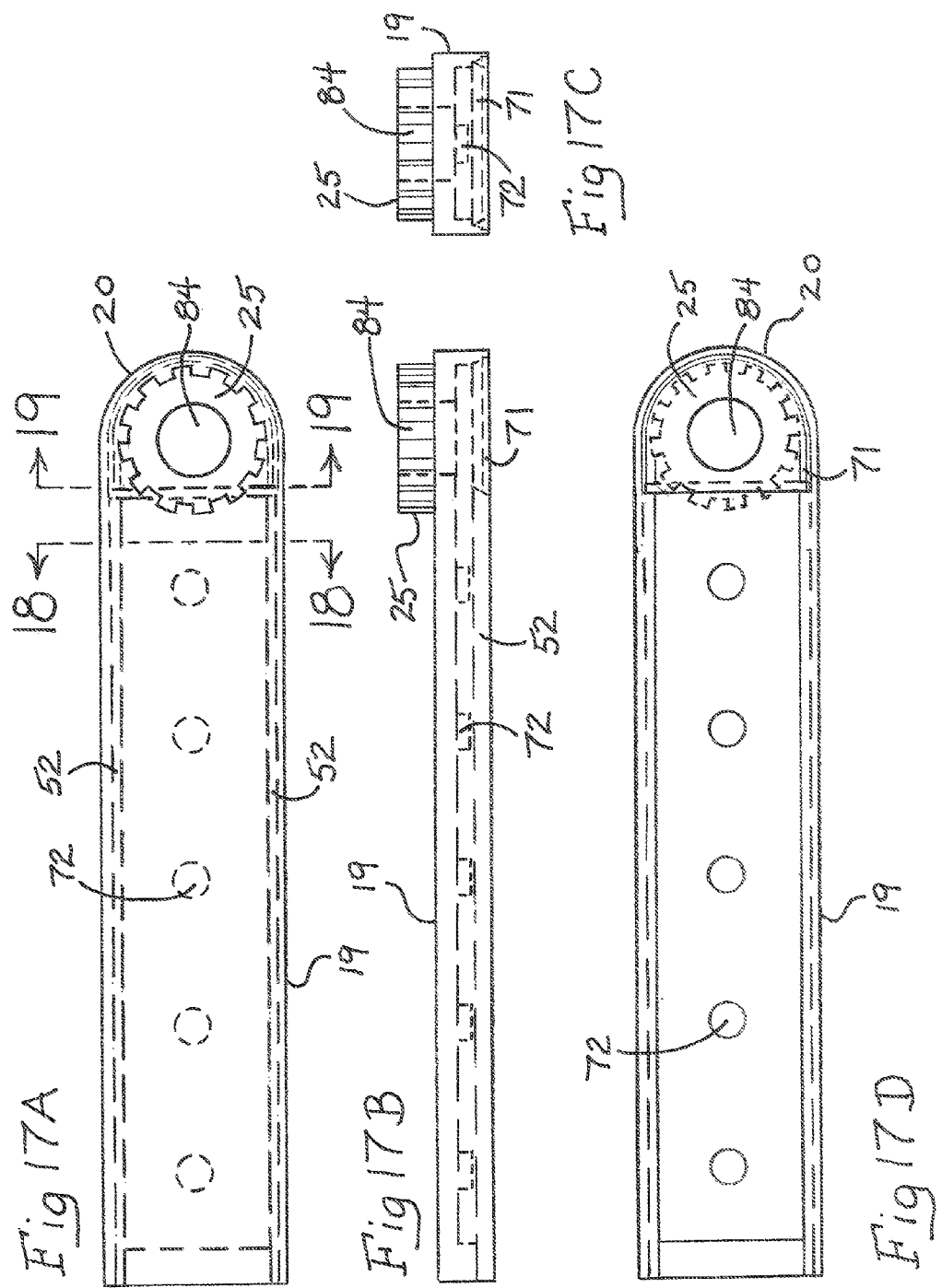

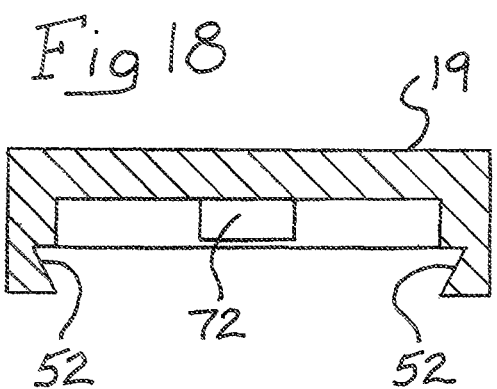
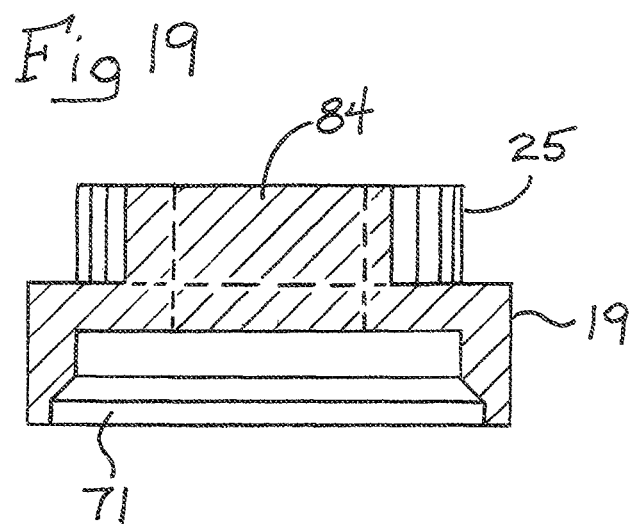

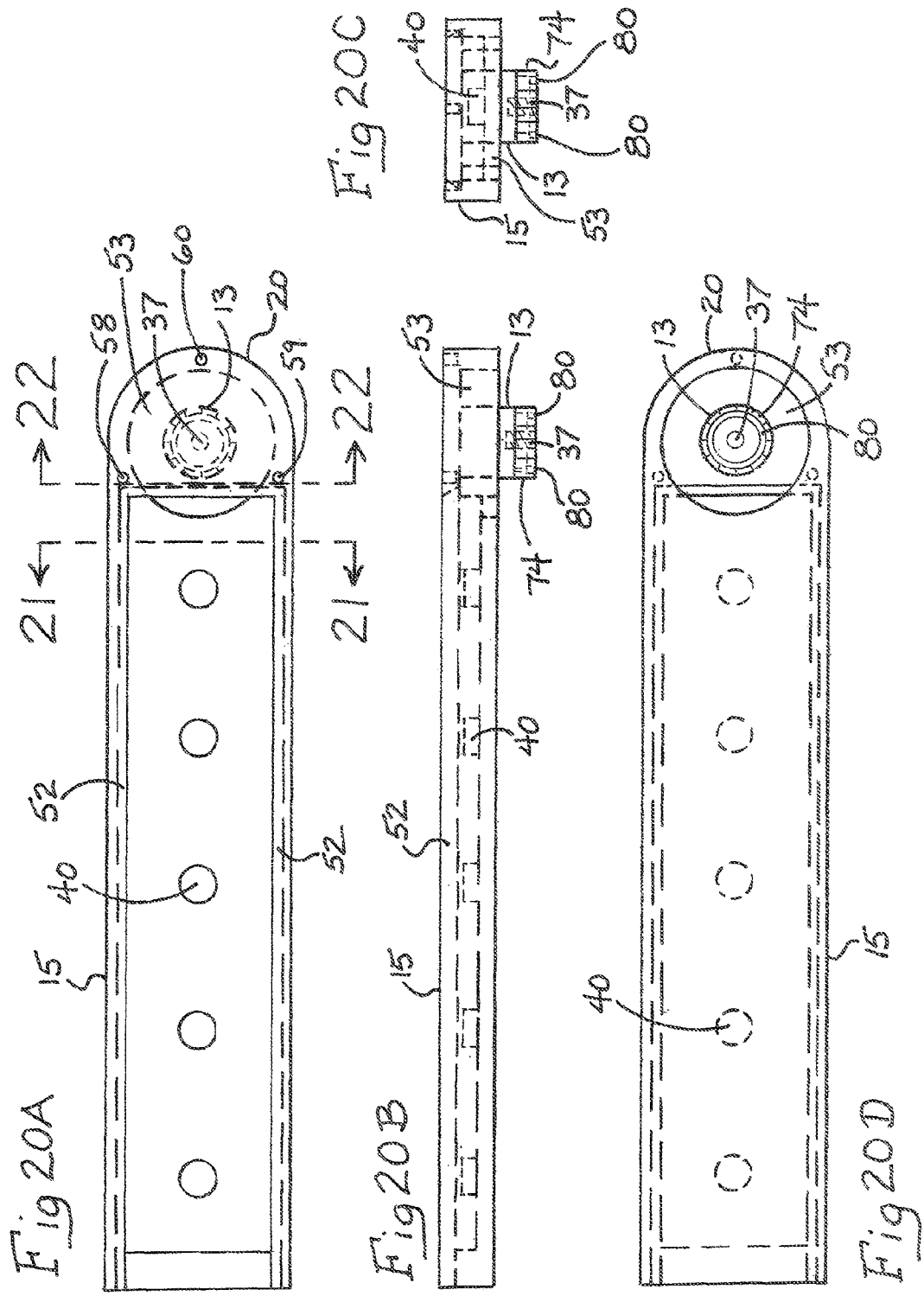

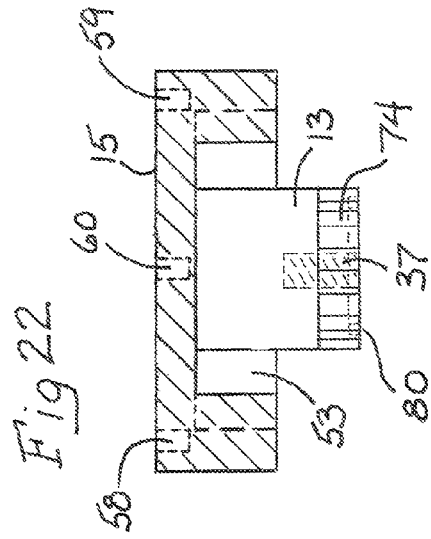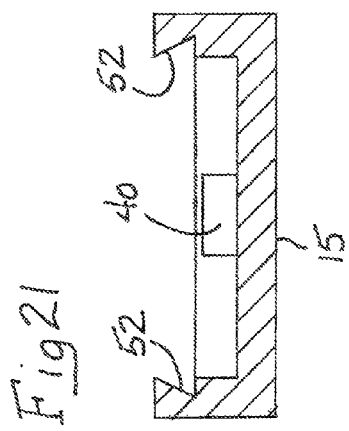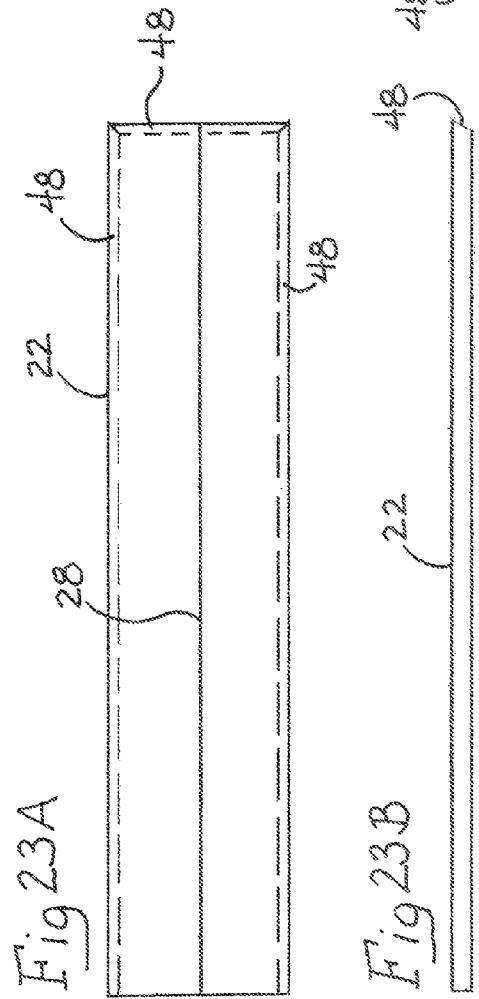

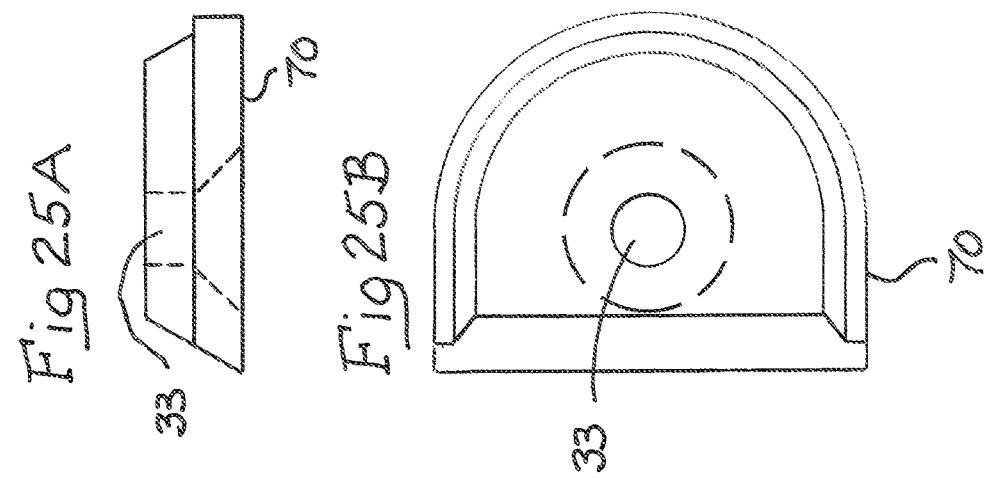
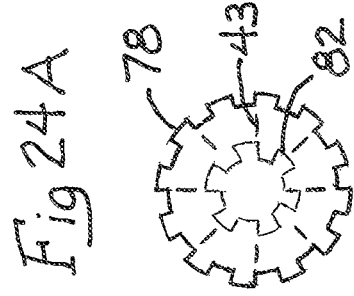
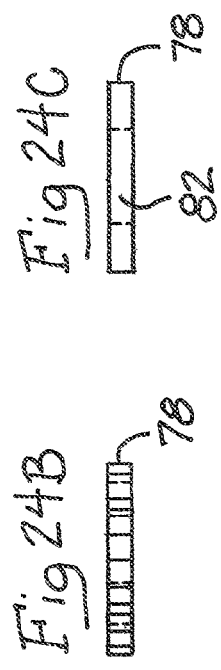
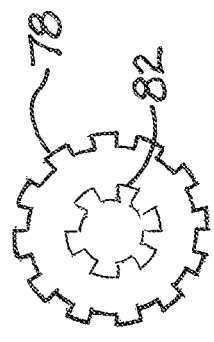

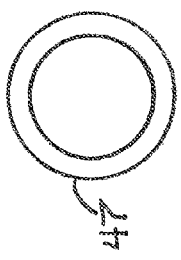
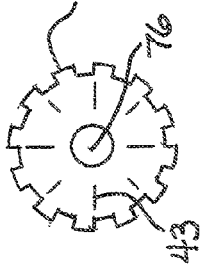
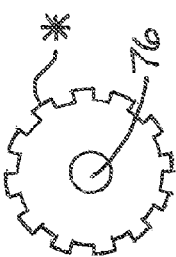
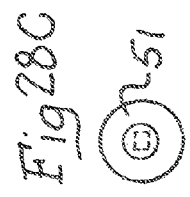
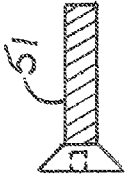
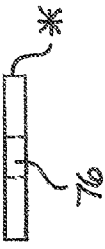
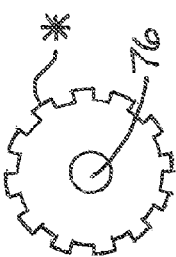

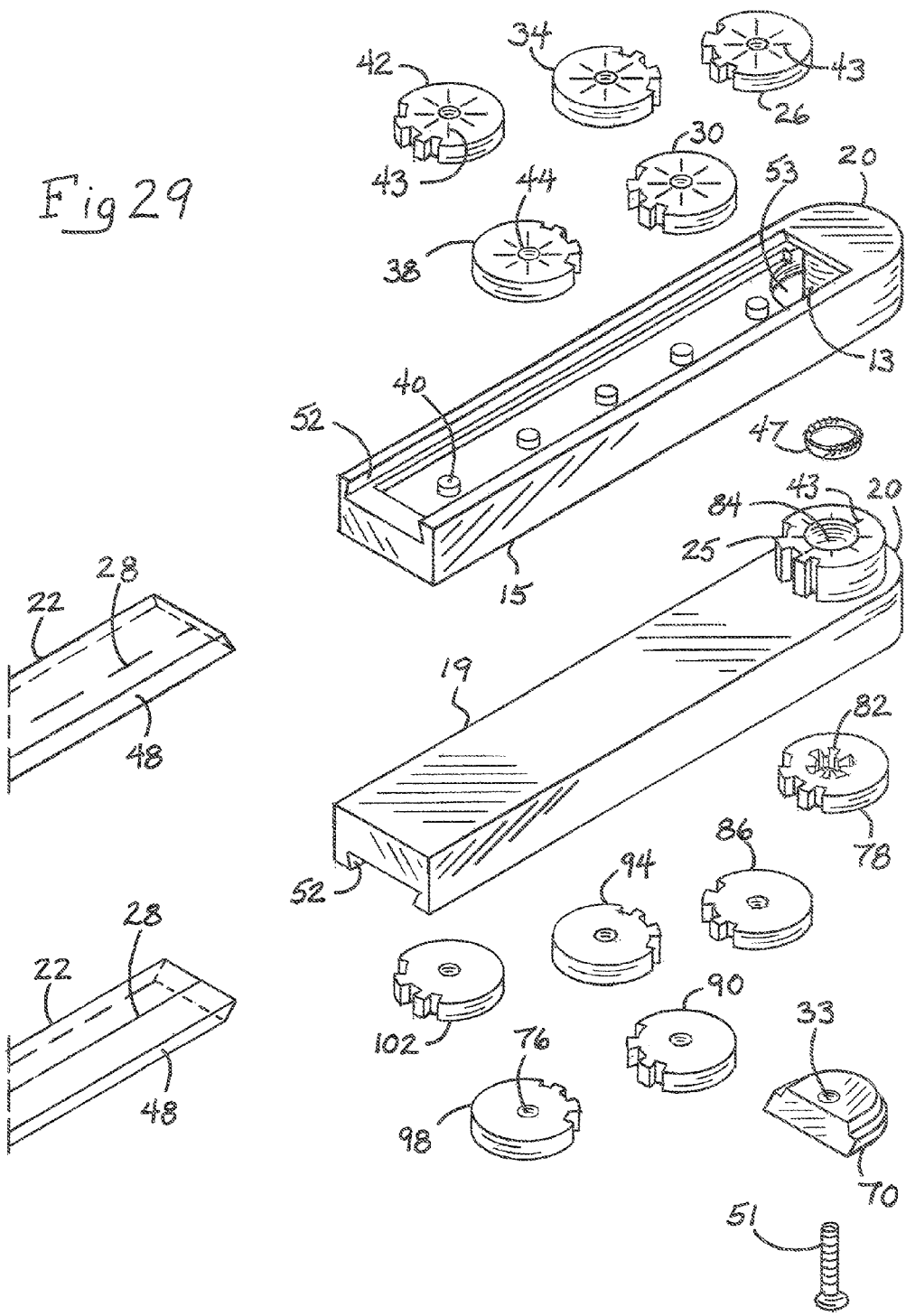

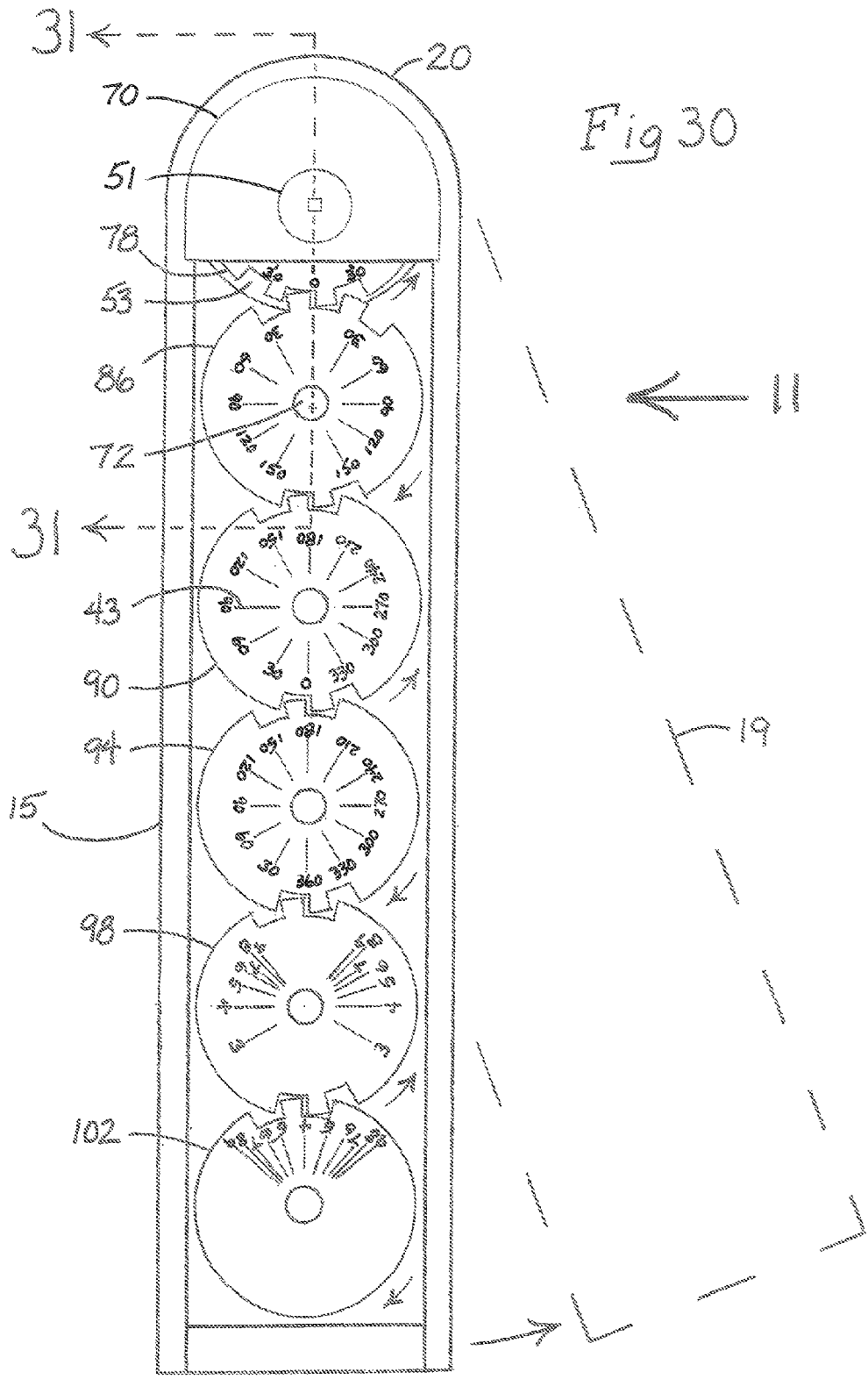

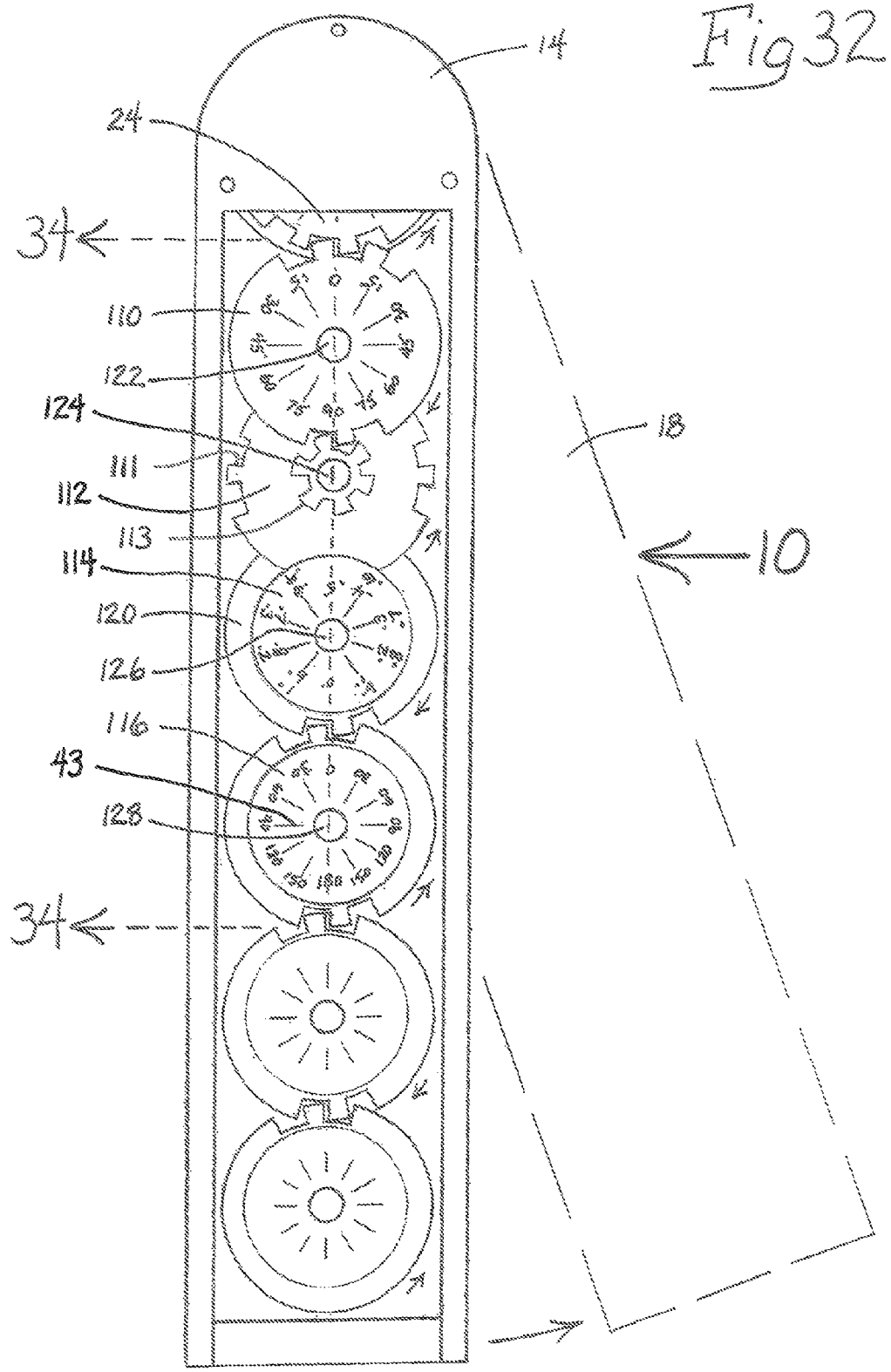

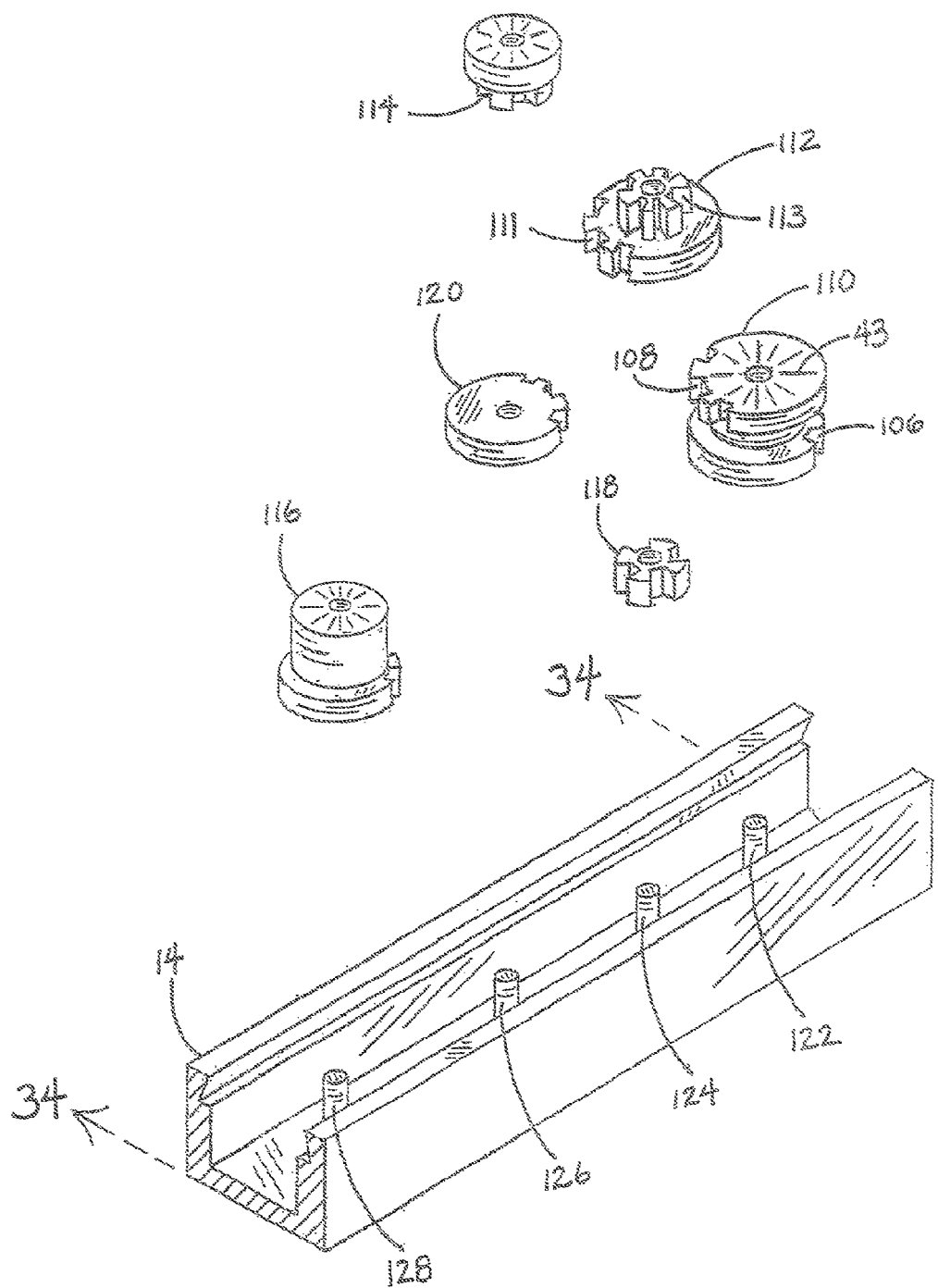

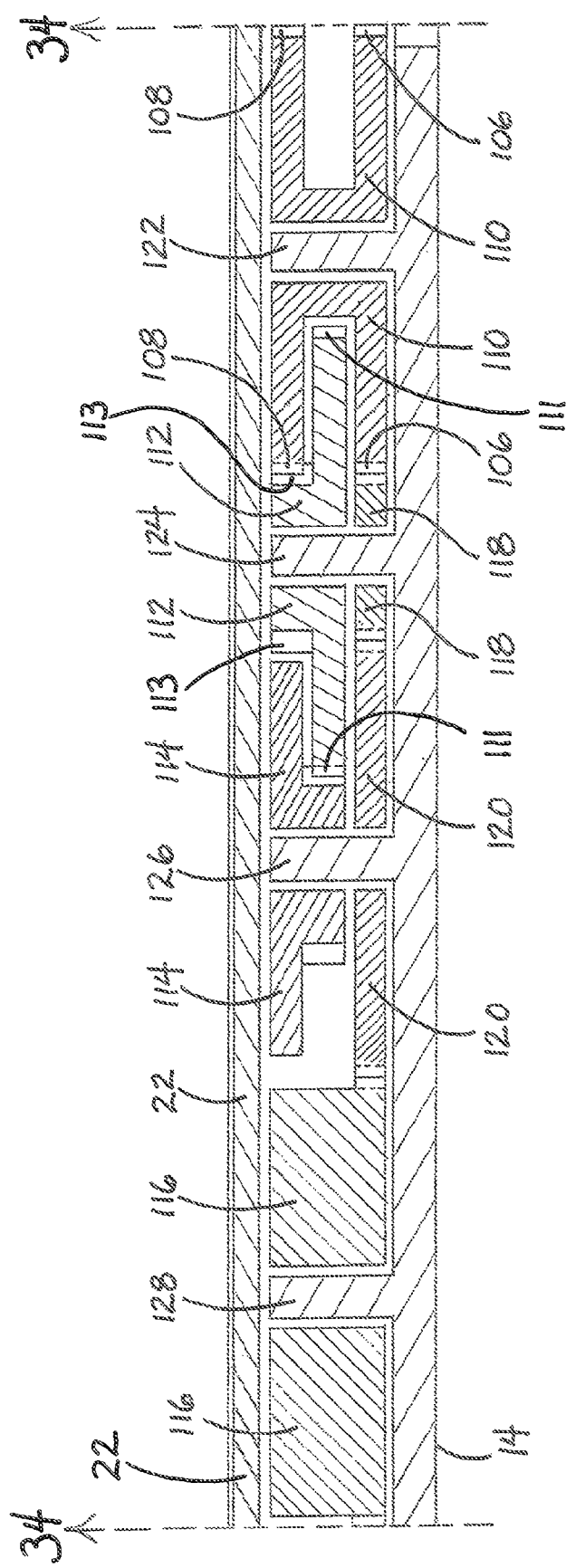

GEAR ACTUATED ANGLE MEASUREMENT TOOL

BACKGROUND OF THE INVENTION

This invention has to do with a measuring tool for use in the construction profession with particular applicability to finish carpentry, framing carpentry, wall layout, drywall installation, fitting countertops, piping layouts, floor and ceiling installations and cabinetry. It also has direct applications in the graphic arts field, the engineering and drafting fields and other manufacturing situations where angle measurements are performed. This invention has direct applications in virtually every situation requiring an angle measurement, and it has a multitude of professional and household applications, providing precise angle readings for any carpentry project and any other project that requires angle measurement, angle copying, angle transferring, and/or angle projection. Such projection of an angle may be accomplished with a laser, scope or other means of projecting or sighting to a distant point, line, plane or planes.

This invention is used in the fitting of trim and decorative pieces, or any material, to the surface of wall surfaces, or any surfaces, which meet at an angular junction. This angular junction is commonly referred to as a miter joint. A miter saw/miter box is used to cut the trim and decorative pieces, or any material, in a precise manner so that a clean and accurate miter joint is established.

The invention is also used for fitting single pieces of trim, or any material, into any angle that is encountered. A miter saw/miter box is used to cut the material in a precise manner so that a clean and accurate fit is established between the freshly cut piece and the work surface(s).

In addition to the above-mentioned functions, which are specific to the angle scale that is virtually universal to the miter saw/miter box, this invention also has scales for determining the actual angle, or any interpretation of the actual angle, throughout an entire revolution (zero degrees through 360 degrees).

This invention has additional scales for determining, transferring and laying out the angles for common roof pitches. In the preferred embodiment, these scales are laid out in the standard "inches of rise per lineal foot." The indicated roof pitch is simultaneously converted to a protractor or miter saw/miter box setting.

This invention also has scales for determining, transferring and laying out gradients. In the preferred embodiment, the slopes (grades) are presented for reading in percentages wherein 0% slope is horizontal and 100% slope is a 45° angle with respect to horizontal.

While a miter saw/miter box is the preferred and generally most accurate way to achieve the angled cuts determined by the invention, other means such as a hand saw, hand-held circular saw, radial arm saw, table saw, jig saw and any other means for achieving the determined cuts are contemplated by the inventor.

This invention has a laser/scope accessory and provision is made for said laser/scope accessory to be attached to the invention. The union of this invention with the laser/scope accessory provides a means for projecting any angle setting from a chosen point of origin along the angle chosen and out to a distance limited only by the power of the laser/scope. Such a laser/scope projection is useful in the layout of walls and construction angles, regardless of what plane they are in. Such a laser/scope projection is also useful in the electrical, plumbing, drywall and landscaping fields, as well as any trade or endeavor that requires the accurate determination, and/or projection, of any angle. It should be understood that a laser/scope, or lasers/scopes, might also be incorporated in the body of the tool as a permanent fixture(s). All such alternative means for employing a laser(s), scope(s) or other means of projecting or sighting on the measuring tool are contemplated by the inventor.

BRIEF SUMMARY OF THE INVENTION

It is an object of this invention to provide an easy to use tool to transfer angle readings from a work place surface(s) to a miter saw/miter box, to any other cutting device, or directly to any work piece, in a one-step operation.

It is a further object of this invention to measure and/or project with a laser, scope or other means, an angle, its complementary angle, its supplementary angle, common roof pitch angles, gradients and/or any angle measurement to which the several scales might be adapted. In the preferred embodiment all of these angle measurements are measured and projected simultaneously.

In the preferred embodiment of the invention an angle measurement tool is provided that in its final form has two interacting legs and a plurality of interacting gears. The first of the two legs has a fixed gear assembly at the axis of the two interacting legs. The second leg has one or more gears which are driven by the aforementioned fixed gear assembly on the first leg. One or more of these gears serve as dials for the purpose of displaying and reading a variety of angle measurements. Both of the legs and those gears employed as dials have a plurality of scale measurements scribed upon them. The tool is so constructed that the movement of the two legs relative to each other will result in an angle being formed there between that will be measured by referring to a setting on the scales so provided for the gears and the legs.

The tool can be utilized to measure the miter joint angle, bevel and miter settings for compound angles, the actual angle made by the legs of the tool, the complementary angle of the actual angle, the supplementary angle of the actual angle, the common roof pitch angle, gradients, and/or any angle measurement to which the several scales might be adapted. In the preferred embodiment, all of these angle measurements are measured simultaneously. The tool can also be utilized with its laser/scope accessory (or integral laser[s] and/or scope[s]) to measure, layout and project wall angles, construction angles and any angle encountered or required. This improvement is accomplished by attaching the twin-beamed laser/scope to the invention and projecting/sighting a line along a chosen angle from a known point to any other point along the laser beam(s) or sighted line(s). Said point, or points, along the projected laser beam(s), or sighted line(s), must be located in order to achieve a proper rendition of the angle required, and the laser/scope accessory achieves that purpose in a one-step operation. It should be understood by those practiced in the art that many additional deployments of lasers or scopes might be employed for a variety of angle projections that are calculated by the measuring tool. The laser, or lasers, can be used to project planes as well as points along a line. These lasers can be deployed in many useful layouts that are directly related to any of the many angle functions to which the tool can be calibrated. It should be further understood that said laser(s), or scope(s), might also be integrated into the measuring tool, in addition to, or as an alternative to the laser (or scope) accessory.

A first alternate embodiment is presented in which both legs are provided with a fixed gear assembly at the axis of the two interacting legs. Both legs are similarly fit with one or more gears which are driven by the aforementioned fixed gear of the respective opposite leg. This improvement provides the ability to have additional indicia bearing gears and thus the ability to provide additional angle measurements.

In addition, a second alternate embodiment is presented which improves on the gear trains in both the preferred embodiment and the first alternate embodiment. As will be evident in the descriptions and drawings to follow, this second alternate embodiment employs compound gears on either or both legs of the tool to provide angle measurements to a still greater degree of precision as compared to those measurements provided by a non-compound gear train.

BRIEF DESCRIPTION OF THE DRAWINGS

FIG. 1 is a perspective view of all of the components of tool 10 as assembled with the legs forming an acute angle.

FIGS. 2A, 2B, and 2C are orthographic views of bottom leg 18.

FIGS. 3A, 3B, 3C and 3D are orthographic views of top leg 14.

FIG. 4 is a section view of top leg 14.

FIG. 5 is a section view of top leg 14.

FIGS. 6A, 6B and 6C are orthographic views of gear cover 22.

FIGS. 7A, 7B, 7C and 7D are orthographic views of gears 26, 30, 34, 38 and 42.

FIGS. 8A, 8B and 8C are orthographic views of 'O' ring 46.

FIGS. 9A, 9B and 9C are orthographic views of bolt 50.

FIG. 11 is a plan view of tool 10 as assembled in a closed position. Direction of movement is shown by arrows. Gear cover 22 is not shown.

FIG. 12 is a section view of tool 10 as assembled in a closed position.

FIGS. 13A, 13B, 13C and 13D are orthographic views of the laser device 54.

FIG. 14 is a perspective view of laser device 54.

FIG. 15 is a perspective view of laser device 54.

FIG. 16 is a perspective view of all of the components of tool 11 as assembled with the legs forming an acute angle.

FIGS. 17A, 17B, 17C and 17D are orthographic views of bottom leg 19.

FIG. 18 is a section view of bottom leg 19.

FIG. 19 is a section view of bottom leg 19.

FIGS. 20A, 20B, 20C and 20D are orthographic views of top leg 15.

FIG. 21 is a section view of top leg 15.

FIG. 22 is a section view of top leg 15.

FIGS. 23A, 23B and 23C are orthographic views of gear cover 22 of tool 11.

FIGS. 24A, 24B, 24C and 24D are orthographic views of fixed gear assembly 78.

FIGS. 25A and 25B are, respectively, elevation and plan views of assembly washer 70.

FIGS. 26A, 26B, 26C and 26D are orthographic views of gears 86, 90, 94, 98 and 102.

FIGS. 27A, 27B and 27C are orthographic views of 'O' ring 47.

FIGS. 28A, 28B and 28C are orthographic views of bolt 51.

FIG. 29 is an exploded view of tool 11.

FIG. 30 is a plan view of tool 11 as assembled in a closed position. Direction of movement is shown by arrows. Gear cover 22 is not shown.

FIG. 32 is a plan view of tool 10 as assembled in a closed position. Direction of movement is shown by arrows. Gear cover 22 is not shown.

FIG. 33 is an exploded view of the components shown in section view 34. Gear cover 22 is not shown.

FIG. 34 is a section view which applies universally to leg 14 of tool 10 and to legs 15 and 19 of tool 11.

DETAILED DESCRIPTION OF THE INVENTION

Figure 10:
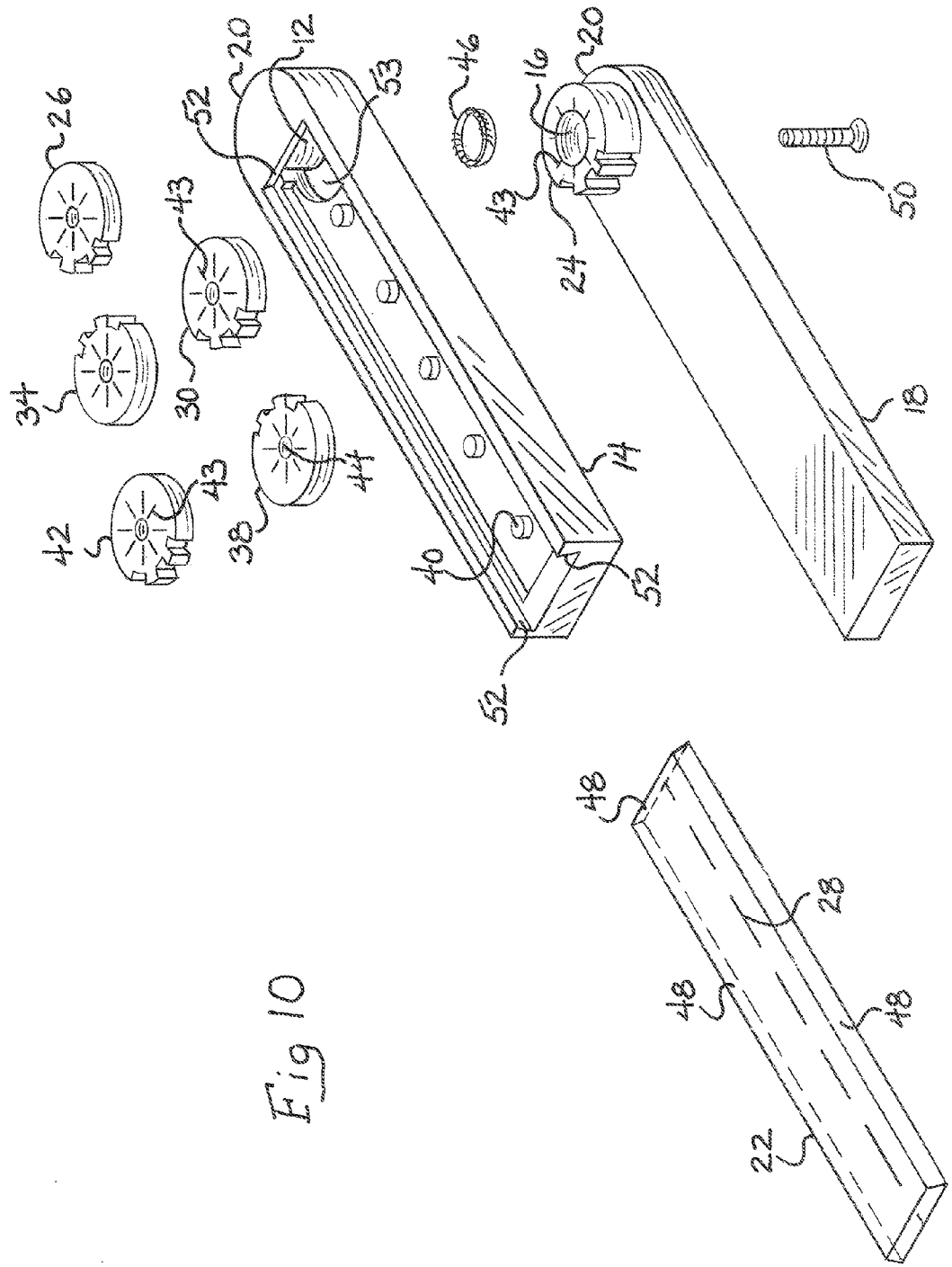
FIG. 10 is an exploded view of tool 10.

As can be seen in the FIGS. 1-12 the preferred embodiment of angle measurement tool 10 is constructed from several components including top leg 14, bottom leg 18, bolt 50 and a plurality of interacting gears. Legs 14 and 18 are the same width and both have a circular shaped end 20. It should be understood that circular shaped end 20 of both leg 14 and leg 18 is a semicircle of a circle having a diameter equal to the width of leg 14 and leg 18. It should be further understood that leg 14 and leg 18 might be wider or narrower than circular shaped end 20 where the legs extend beyond the circle described by circular shaped end 20. It should also be understood that leg 14 and leg 18 might have non-parallel edges and tool 10 will still function as intended. Leg 14 is provided with projected axis spindle 12 at the center of the circle of which circular shaped end 20 is a part. Axis spindle socket 16 of bottom leg 18 is provided at the center of the fixed gear assembly 24 which is at the center of the circle of which circular shaped end 20 is a part. In the preferred embodiment, projected axis spindle 12 is circular in shape and has a diameter equal to or less than the diameter of axis spindle socket 16, as shown in the figures. It should be understood that projected axis spindle 12 has a diameter equal to or less than the diameter of the axis spindle socket 16 as a function of the assembly of tool 10 and thus to facilitate precisely pivoting legs 14 and 18 secured by bolt 50. It should be further understood that projected axis spindle 12 does not have to be in the shape of a circle in order for tool 10 to operate in the fashion described. Variable friction adjustment for the pivoting legs 14 and 18 is provided when 'O' ring 46 is compressed by projected axis spindle 12 into axis spindle socket 16 when bolt 50 is tightened through bolt hole 32 in leg 18 and into threaded bolt hole 36 in leg 14, as shown in the figures. Bolt hole 32 and threaded bolt hole 36 are at the center of the circle of which circular shaped end 20 is a part. With legs 14 and 18 so engaged, fixed gear assembly 24 meshes with gear 26 in a secure and rotationally precise manner. Fixed gear assembly 24 of leg 18 is housed within fixed gear cavity 53 in leg 14 in the assembled tool 10. When the legs 14 and 18 are pivoted around their common axis as defined by projected axis spindle 12 and axis spindle socket 16, fixed gear assembly 24 meshes with and turns gear 26, which in turn meshes with and turns gear 30, which meshes with and turns gear 34, which meshes with and turns gear 38, which meshes with and turns gear 42. Gears 26, 30, 34, 38 and 42 are each precisely located for accurate meshing and rotation by axis pivots 40 located in close tolerance within gear center holes 44 as shown in the figures. Any or all of the gears may include dial indicia 43 for the purpose of measuring any angle reading throughout a full revolution of either leg 14 or leg 18. As indicated in FIG. 11, each of the gears 24, 26, 30, 34, 38 and 42 is supplied with dial indicia 43 which are comprised of straight lines radiating outward from the rotational center of these gears. The purpose of these several gears is to simultaneously provide a variety of useful angle measurements on scales specifically suited to the work at hand. For example, the indicia on fixed gear assembly 24 would be marked with a protractor scale, in a 0°-180°-0° format, providing the actual angle determined by the relative positions of leg 14 and leg 18; in turn, gear 26 would provide the protractor scale in a 180°-0°-180° format, gear 30 would provide a scale for the miter saw setting for miter joints, gear 34 would provide a scale for the miter saw setting for butt joints, gear 38 would provide a scale for the roof pitch reading in 'inches of rise per lineal foot', gear 42 would provide a scale for gradients expressed as a percentage. This example is one of many configurations possible, dependent only on the angle measurements chosen for the several gears and the relative positions of these several interchangeable gears, whose interchangeability is described below. In the preferred embodiment, fixed gear assembly 24 and gears 26, 30, 34, 38 and 42 are the same diameter and have the same number of gear teeth, thus gears 26, 30, 34, 38 and 42 are interchangeable to suit the user's preference. Gears 26, 30, 34, 38 and 42 may also be reversible, thus providing their reverse side for additional angle measurements. Further, the interchangeable design of the gears provides the opportunity to substitute additional gears provided with specialized scales for use in any field of endeavor requiring precise measurement and layout of particular angles for particular purposes. The various gears would be so marked, or colored, as to provide immediate identification and differentiation of the various scales. It should be apparent to those practiced in the art that interchangeability and reversibility of the gears is not a necessary component of the invention and that the various gears need not be identical in shape, interchangeable or reversible for the invention to function as intended; all such non-interchangeable and non-reversible configurations are contemplated by the inventor. A means for accurately reading these several angle measurements is provided by indicator line 28 placed along the center of gear cover 22 as shown in the figures. It should be understood that many other locations for indicator line(s) 28 on gear cover 22 and/or leg 14 are possible and are contemplated by the inventor. In the preferred embodiment gear cover 22 is transparent and indicator line 28 is provided on the surface of gear cover 22 which is closest to gears 24, 26, 30, 34, 38 and 42. In the preferred embodiment gear cover 22 is of a form that provides beveled edges 48 which securely mate with dovetail channel 52 providing a secure location for gear cover 22. Gear cover 22 is retained by friction, ball catch, screw(s), latch(es), magnet(s) or any of the many suitable means that should be apparent to those skilled in the art. The inventor contemplates all such means of securing gear cover 22 in its assembled location within dovetail channel 52. So located, gear cover 22 retains gears 26, 30, 34, 38 and 42 securely in their proper working locations with their respective gear center holes 44 engaged with their respective axis pivots 40. Areas of the surfaces of gear cover 22 which are not necessary areas for viewing angle readings determined by indicator line 28 may be masked so as to provide a well delineated reading environment for the several angle readings so provided. It should be understood by those practiced in the art that gear cover 22 may be opaque and readings can be accomplished through openings and/or lenses in its surface; further, it should be understood that many variations of gear retention and reading means for the various scales and indicia are possible and that all such alternatives are contemplated by the inventor. It should be understood that fixed gear assembly 24 may or may not be constructed in union with leg 18, but in its final form tool 10 comprises a bottom leg 18 that is in fixed union with fixed gear assembly 24, such that, in operation, leg 18 is a single piece rigidly attached to, or constructed with, fixed gear assembly 24. In operation tool 10 simultaneously provides the miter joint angle measurement, the actual angle made by the legs 14 and 18, the complementary angle measurement of the actual angle, the supplementary angle measurement of the actual angle, roof pitch angles, gradients and/or any angle measurement to which the several scales are adapted. It should be understood by those practiced in the art that any number and any size or variety of gears can be employed in infinite configurations and that all such alternate deployments of gears driven by fixed gear assembly 24 are contemplated by the inventor. It should be further understood by those practiced in the art that, as an alternative, supplement, or addition to the preferred embodiment in which the various gears mesh directly with one another, that a gear-toothed belt drive, friction belt drive, or similar means might be employed as an alternative, supplementary or additional means of rotating all, or some, of the various gears and/or dials and that the inventor contemplates all such variations. Further, the inventor wishes it to be understood that various other friction inducing means other than 'O' ring 46 should be apparent to those practiced in the art and that the inventor contemplates all such friction inducing means including the substitution of a suitable magnet for 'O' ring 46 and bolt 50, said magnet located in the bottom of the axis spindle socket 16 and magnetically engaging a magnetized projected axis spindle 12. Alternate embodiments are contemplated by the inventor in which a wide variety of angle readings may be accomplished on the top surfaces, bottom surfaces and edges of, either or both of legs 14 and 18 in which leg indicia 45 and certain scales are employed at various significant intersections of legs 14 and 18 as they bypass each other while being adjusted to the work surfaces which are being measured.

As can be seen in FIGS. 3A, 3B, 3C and 3D, leg 14 is provided with three peg holes 58, 59 and 60. In the preferred embodiment peg holes 58, 59 and 60 are flush and perpendicular with the top surface of leg 14. Peg holes 58, 59 and 60 are entirely contained between the bottom and top surfaces of leg 14. Peg holes 58, 59 and 60 may be similarly placed in leg 18. Peg holes 58, 59 and 60 may be of the same shape as each other or they may be unique shapes. FIGS. 13A, 13B, 13C, 13D, 14 and 15 illustrate laser device 54. Laser device 54 is intended for projecting diametrically opposed laser beams 64 and 65 in diametrically opposite directions from each other. Laser device 54 is fitted with three pegs 67, 68 and 69 that precisely match the shape or shapes of peg holes 58, 59 and 60. Pegs 67, 68 and 69 may be of the same shape as each other or they may be unique shapes. Pegs 67, 68 and 69 are fit perpendicular to the bottom surface 62 of laser device 54. Bottom surface 62 is in a single plane. Bottom surface 62 is parallel with laser beams 64 and 65. The relative positions of pegs 67, 68 and 69 are such that they fit respectively in peg holes 58, 59 and 60 and in so doing they attach laser device 54 to leg 14 or leg 18 such that laser beams 64 and 65 are parallel to the angle chosen on leg 14 or leg 18, according to the application chosen. In the preferred embodiment pegs 67, 68 and 69 are circular and made of steel, either magnetized or not magnetized. It should be understood that other shapes and materials are contemplated for pegs 67, 68 and 69. It should also be understood that magnetic attachment is one of many means contemplated for attaching laser device 54 to leg 14 and/or leg 18. Laser beams 64 and 65 are energized from a battery(ies) contained within laser device 54. Laser beams 64 and 65 may be generated from a single source and redirected on diametrically opposite paths. Laser beams 64 and 65 may also be generated separately. Laser beams 64 and 65 may be generated not only as single lines, but might also be projected as planes or any number of planes. In operation laser device 54 is affixed to tool 10 by placing pegs 67, 68 and 69 in peg holes 58, 59 and 60. It should be recognized by those practiced in the art that various other means of attaching laser device 54 to tool 10 are possible and those ways are contemplated by the inventor. Laser beams 64 and 65 are employed to project angles. In the preferred embodiment, the union of tool 10 and laser device 54 projects laser beams 64 and 65 along one side of the angle made by the legs 14 and 18. The other side of the angle made by the legs 14 and 18 represents the base line from which the particular angle is being calculated and projected. Whichever of the legs 14 and 18 that does not have the laser device 54 mounted on it is the leg that is set parallel to the base line. Laser beams 64 and 65 are by design always parallel to one side of the angle being measured and projected. Laser beam 64 is aimed at the spring point of the angle that is to be projected. Laser beam 65 projects the chosen angle along and beyond the angle made by the legs 14 and 18. It should be understood by those practiced in the art that there are alternate embodiments for a laser, or lasers, in which the laser function(s) are an integral part of tool 10 in addition to laser device 54, or in place of laser device 54. All such alternate embodiments are contemplated by the inventor. It should be understood that sighting scopes may be substituted for, or mounted in unison with, the laser beam in laser device 54. Laser device 54 as herein described is also intended for use with tool 11, described in the first alternate embodiment below. Additionally, laser device 54 is intended for all alternate embodiments described herein and those other embodiments contemplated by the inventor which should be apparent to those practiced in the art.

Figure 31:
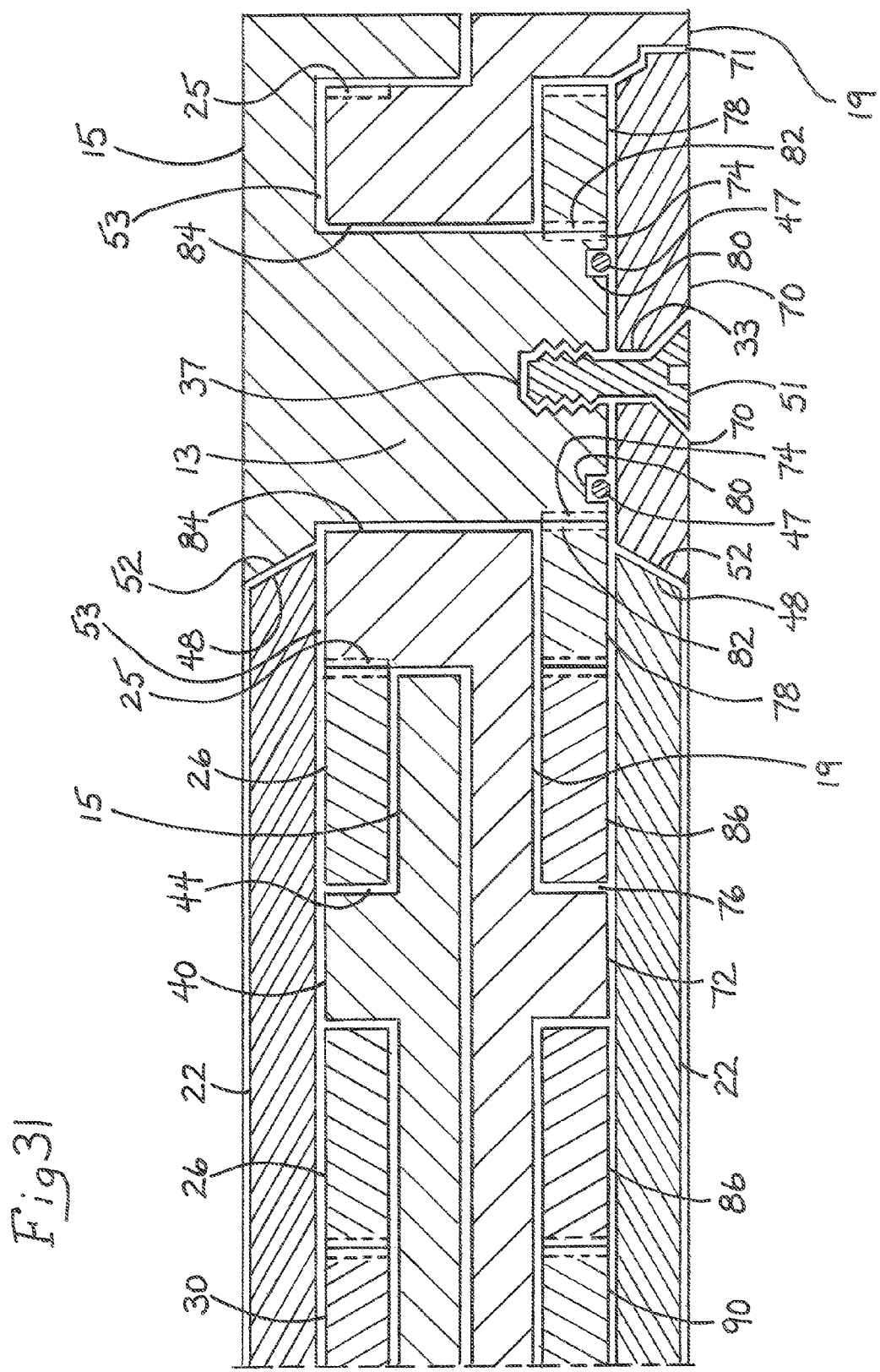
FIG. 31 is a section view of tool 11 as assembled in a closed position.

The following description of the first alternate embodiment of the invention utilizes the same reference numbers as those described in the preferred embodiment above in such cases where members are the same in both embodiments. New reference numerals have been assigned in cases where members are new or in some respects different when comparing the two embodiments. FIGS. 16-31 disclose the first alternate embodiment, tool 11, in which leg 15 is provided with a projected axis spindle 13 at the center of the circle of which circular shaped end 20 is a part. The projected axis spindle 13 is provided with threaded bolt hole 37 at the center of the circle of which circular shaped end 20 is a part, as shown in the figures. Leg 19 is provided with axis spindle socket 84 at the center of the circle of which circular shaped end 20 is a part. Leg 19 securely houses assembly washer 70 which is so constructed as to provide a secure fit in recess 71 for rotatably engaging projected axis spindle 13 with bolt 51 as bolt 51 passes through bolt hole 33 which is provided in washer 70 at the center of the circle of which circular shaped end 20 is a part. A portion of projected axis spindle 13 is provided with projected axis spindle gear teeth 74 for reasons that will become apparent below. As shown in the figures, fixed gear assembly 25 is housed within fixed gear cavity 53 in order to drive the gear train of top leg 15 in the same fashion as fixed gear assembly 24 drives the gear train of top leg 14 of tool 10 in the preferred embodiment; the latter being illustrated in FIG. 11. As tool 11 is assembled, bolt 51 passes through bolt hole 33 into threaded bolt hole 37, so assembling leg 15 and leg 19 such that they rotate securely in relation to each other with an axis the center of which is located at the center of the circle of which circular shaped end 20 is a part. 'O' ring 47 is provided as a frictional interface between projected axis spindle 13 and washer 70, with adjustable rotational friction for legs 15 and 19 provided as bolt 51 is tightened or loosened to the tool user's preference. In this first alternate embodiment 'O' ring 47 is located in 'O' ring channel 80 which is concentrically located on the end of projected axis spindle 13 which houses threaded bolt hole 37 at its center. Accurate rotation of legs 15 and 19 is ensured by the close-tolerance fit of projected axis spindle 13 as it revolves within axis spindle socket 84. Projected axis spindle gear teeth 74 are fixedly engaged with fixed gear assembly 78 by meshing with the mating internal gear 82 contained at the center of fixed gear assembly 78; fixed gear assembly 78 then meshes with and turns gear 86, which in turn meshes with and turns gear 90, which meshes with and turns gear 94, which meshes with and turns gear 98, which meshes with and turns gear 102. Gears 86, 90, 94, 98 and 102 are each precisely located for accurate meshing and rotation by axis pivots 72 located in close tolerance within gear center holes 76 as shown in the figures. Any or all of the gears may be provided with dial indicia 43 for the purpose of determining any angle reading throughout a full revolution of either leg 15 or leg 19. As indicated in FIG. 30 each of the gears 78, 86, 90, 94, 98 and 102 is provided with dial indicia 43 which are comprised of straight lines radiating outward from the rotational center of these gears. The purpose of these several gears is to simultaneously provide a variety of useful angle measurements on scales specifically suited to the work at hand. For example, the indicia on fixed gear assembly 78 would be marked with a protractor scale, in a 0°-180°-0° format, providing the actual angle determined by the relative positions of leg 15 and leg 19; in turn, gear 86 would provide the protractor scale in a 180°-0°-180° format, gear 90 would provide a scale for the explementary angle in a 0°-360° format, gear 94 would provide a scale for the explementary angle in a 360°-0° format, gear 98 would provide a scale for the miter saw settings for constructing equiangular polygons employing miter joints, gear 102 would provide a scale for the miter saw settings for constructing equiangular polygons employing butt joints. This example is one of many configurations possible, dependent only on the angle interpretations chosen for the several gears and the relative positions of these several interchangeable gears, whose interchangeability is described below. In the preferred embodiment, fixed gear assembly 78 and gears 86, 90, 94, 98 and 102 are the same diameter and have the same number of gear teeth, thus gears 86, 90, 94, 98 and 102 are interchangeable to suit the user's preference. Gears 86, 90, 94, 98 and 102 may also be reversible, thus providing their reverse side for additional angle measurements. Further, the interchangeable design of the gears provides the opportunity to substitute additional gears provided with specialized scales for use in any field of endeavor requiring precise measurement and layout of particular angles for particular purposes. The various gears would be so marked, or colored, as to provide immediate identification and differentiation of the various scales. It should be apparent to those practiced in the art that interchangeability and reversibility of the gears is not a necessary component of the invention and that the various gears need not be identical in shape, interchangeable or reversible for the invention to function as intended; all such non-interchangeable and non-reversible configurations are contemplated by the inventor.

A means for accurately reading these several angle measurements is provided by indicator line 28 which is placed along the center of gear cover 22 as shown in the figures. It should be understood that many other locations for indicator line(s) 28 on gear cover 22 and/or legs 15 and 19 are possible and are contemplated by the inventor. In this first alternate embodiment gear cover 22 is transparent and indicator line 28 is provided on the surface of gear cover 22 which is closest to gears 78, 86, 90, 94, 98 and 102. In this first alternate embodiment gear cover 22 is of a form that provides beveled edges 48 which securely mate with dovetail channel 52 providing a secure location for gear cover 22. Gear cover 22 is retained by friction, ball catch, screw(s), latch(es), magnet(s) or any of the many suitable means that should be apparent to those skilled in the art. The inventor contemplates all such means of securing gear cover 22 in its assembled location within dovetail channel 52. So located, gear cover 22 retains gears 86, 90, 94, 98 and 102 securely in their proper working locations with their respective gear center holes 76 engaged with their respective axis pivots 72. Areas of the surfaces of gear cover 22 which are not necessary areas for viewing angle readings determined by indicator line 28 may be masked so as to provide a well delineated reading environment for the several angle readings so provided. It should be understood by those practiced in the art that gear cover 22 may be opaque and readings can be accomplished through openings and/or lenses in its surface; further, it should be understood that many variations of gear retention and reading means for the various scales and indicia are possible and that all such alternatives are contemplated by the inventor. It should be understood that fixed gear assembly 25 may or may not be constructed in union with leg 19, but in its final form tool 11 comprises a bottom leg 19 that is in fixed union with fixed gear assembly 25. In operation tool 11 simultaneously provides the miter joint angle measurement, the actual angle made by the legs 15 and 19, the complementary angle measurement of the actual angle, the supplementary angle measurement of the actual angle, the explementary angle measurement of the actual angle, roof pitch angles, gradients, miter saw settings for constructing equiangular polygons employing miter joints, miter saw settings for constructing equiangular polygons employing butt joints and/or any angle measurement to which the several scales are adapted. It should be understood by those practiced in the art that any number and any size or variety of gears can be employed in infinite configurations and that all such alternative deployments of gears driven by fixed gear assembly 25 and projected axis spindle gear teeth 74 are contemplated by the inventor. It should be further understood by those practiced in the art that, as an alternative, supplement, or addition to the preferred embodiment in which the various gears mesh directly with one another, that a gear-toothed belt drive, friction belt drive, or similar means might be employed as an alternative, supplementary or additional means of rotating all, or some, of the various gears and/or dials and that the inventor contemplates all such variations. Further, the inventor wishes it to be understood that various other friction inducing means other than 'O' ring 47 should be apparent to those practiced in the art and that the inventor contemplates all such friction inducing means including the substitution of a suitable magnet for 'O' ring 47 and bolt 51, said magnet located in the bottom of the projected axis spindle 13 and magnetically engaging a magnetized assembly washer 70. In this alternate embodiment there would be no bolt 51 and assembly washer 70 would have no bolt hole 33 and thus assembly washer 70 would be secured to leg 19 with screws at a point or points located around the outer edge of assembly washer 70 or by any of several other means which should be apparent to those practiced in the art. Alternate embodiments are contemplated by the inventor in which a wide variety of angle readings may be accomplished on the top surfaces, bottom surfaces and edges of either or both of legs 15 and 19 in which leg indicia 45 are employed at various significant intersections of legs 15 and 19 as they bypass each other while being adjusted to the work surfaces which are being measured. Tool 11, so constructed in this first alternate embodiment, provides a gear train on both legs 15 and 19 for the purpose of displaying dial indicia 43 for any and all angle measurements that might be provided by the precisely pivoting legs which pivot around the center of the circle of which circular shaped end 20 is a part. It should also be understood by those practiced in the art that the first alternate embodiment here described may be so employed so as to deploy a gear train on leg 19 alone, or leg 15 alone, as might be desired for a given assembly of the inventions here described.

It should be understood by those practiced in the art that there are a number of arrangements of interlocking "pins", "springs", "cams", "clips", "catches", "levers", "latches", "screws", "projections", "magnetism", "holes", "grooves" and "openings" that will secure projected axis spindle 12/13 of leg 14/15 in rotational union with axis spindle socket 16/84 of leg 18/19 together such that they provide tool 10/11 with a leg 18/19 that revolves securely and accurately around projected axis spindle 12/13 of leg 14/15. The inventor contemplates all of these embodiments, including 'snap-together' designs and designs employing spring loaded ball catches (with or without an 'easy release' button) in addition to those represented in the figures.

The following description of the second alternate embodiment of the invention utilizes the same reference numbers as those described in the preferred embodiment and first alternate embodiment above in such cases where members are the same as those used in either or both of those embodiments as well as in this second alternate embodiment. New reference numerals have been assigned in cases where members are new or in some respects different as utilized in the second alternate embodiment. The second alternate embodiment is applicable to any of the gear trains illustrated in the preferred embodiment and first alternate embodiment described above, as detailed below. FIGS. 32-34 disclose the second alternate embodiment which employs compound gears, the purpose of which are to employ compound gearing to rotate certain gears at a compounded rate as compared to fixed gear assembly 24 of leg 18 of the preferred embodiment, as well as fixed gear assembly 25 of leg 19 and fixed gear assembly 78 of leg 15 of the first alternate embodiment. The compounded rate of rotation of one gear relative to another provides the ability to have certain gears with accurate fractional readings of those results provided by any of the gears described in the preferred embodiment and first alternate embodiment above. It should be understood that the number of gear teeth shown on particular gears in the Figures are not necessarily indicative of the actual number of gear teeth; the depictions of the gear teeth in the Figures are in some instances abbreviated or drawn out of scale for the purpose of clear illustration. For example, FIG. 32 is a plan view of the second alternate embodiment's compound gear train illustrating a gear assembly 110 which revolves at the same, directly proportional, rate as either of the fixed gear assemblies 24, 25 or 78, just as each of the gears in the depicted embodiments of tool 10 and tool 11 revolve at the same, directly proportional, rate as fixed gear assemblies 24, 25 or 78; in every case gear assembly 110 is either directly engaged with either of the fixed gear assemblies 24, 25 or 78, or is engaged by idler gears such that gear assembly 110 rotates at the same, directly proportional, rate as the fixed gear assemblies 24, 25 or 78. In the second alternate embodiment, gear 114 revolves at a rate 180 times greater than that of gear assembly 110. A full revolution of gear 114 thus provides its full dial face for depiction of fractional readings of any single whole degree increment portrayed on gear assembly 110, in doing so a more precise reading of a specific angle is accomplished. More specifically, in this example gear assembly 110 is providing the readings for miter cuts on a miter saw, for which the entire 360° dial must be divided into 180 equally spaced dial indicia 43. Gear 114 thus turns one full revolution for each $1/180^{th}$ revolution of gear assembly 110. The result is a gear 114 which displays fractional readings in tenths, hundredths, or whichever fractional reading is desired. For the purpose of this example, gear 116 is marked as a 180°-0°-180° protractor and revolves at the same rate as gear assembly 110. The increased number of rotations for gear 114 in comparison to gear assembly 110 and gear 116 is accomplished with compound gears as described below and illustrated in the figures. FIG. 33 is an exploded view of the second alternate embodiment's compound gear train illustrating the components shown in section view 34 and depicted in FIG. 34. For the purpose of this description leg 14 is the leg upon which the second alternate embodiment's compound gear train is depicted. It should be understood that the second alternate embodiment's compound gear train is suitable for any and all of the legs 14, 15, and 19 and that the inventor contemplates all such embodiments. FIG. 34 is a section view of the second alternate embodiment depicted in plan in FIG. 32. As assembled, gear assembly 110 is located on axis pivot 122; idler gear 118 is located on axis pivot 124; compound gear 112 is located on top of idler gear 118 on axis pivot 124; idler gear 120 is located on axis pivot 126; gear 114 is located on top of idler gear 120 on axis pivot 126; and gear 116 is located on axis pivot 128. Gear assembly 110, while manufactured or assembled as a single piece, comprises two gears, the lower of those two gears, lower gear 106 is closest to leg 14 and engages idler gear 118, while the upper gear, upper gear 108, engages the upper gear 113 of compound gear 112. Compound gear 112 is manufactured or assembled as a single piece and comprises two gears, the lower of those two gears, lower gear 111 is closest to gear 118 and engages gear 114, while the upper gear, upper gear 113, engages gear 108. Idler gear 118, being thus engaged with lower gear 106, in turn engages idler gear 120, which in turn engages gear 116. This train of gears 106, 118, 120 and 116 is driven by a fixed gear assembly, either 24 or 25 or 78, directly or through idler gear(s), the result being gears 106 and 116 which revolve at the same, directly proportional, rate as the fixed gear assemblies 24 or 25 or 78. Upper gear 108 of gear assembly 110 contains 120 teeth around its circumference and is engaged with the 6 toothed upper gear 113 of compound gear 112. The lower gear 111 of compound gear 112 has 45 teeth around its circumference and is engaged with 5 toothed gear 114. In this second alternate embodiment, compound action of the upper level gears causes the compounded increase in the number of revolutions of gear 114, providing the fractional readings desired by providing a gear 114 which turns 180 full revolutions for each single revolution of gear assembly 110. It should be understood by those practiced in the art that infinite deployments of gear ratios may be employed in such a compound gear train and the inventor contemplates them all. It should be further understood that the second alternate embodiment's compound gear train may comprise as few or as many compound gears as desired, in any number of layers and ratios, and that the inventor contemplates all such combinations of gears. Further, it should be understood that the second alternate embodiment's compound gear train herein described is driven by either fixed gear assembly 24 or fixed gear assembly 25 or fixed gear assembly 78, just as the fixed gear assemblies 24 and 25 and 78 drive the gear trains previously described and depicted in the preferred embodiment and first alternate embodiment denoted respectively as tool 10 and tool 11 above and in the figures. It should be further understood by those practiced in the art that, as an alternative, supplement, or addition to the second alternate embodiment in which the various gears mesh directly with one another, that gear-toothed belt drives, friction belt drives, or similar means might be employed as an alternative, supplementary or additional means of rotating all, or some, of the various gears and/or dials and that the inventor contemplates all such variations. It should be further understood that the compounding of the gear action might be accomplished with epicyclic or planetary gearing or by other gearing means and the inventor contemplates all such variations.

It should be further understood that any number of different scales and indicia can be deployed on any of the gears, leg surfaces or leg edges of the invention, throughout an infinite number of conceivable angle layouts. The inventor contemplates all such variations of the layout of the scales and indicia.

It should be understood by those practiced in the art that all of the above described gears, and those parts in contact or close proximity with those gears, as assembled, may include any of a number of common friction reduction means such as, but not limited to, low-friction materials employed in the construction of the several legs, gears, and gear covers; low-friction washers, bushings, lubricants, or bearings at points of contact between a gear face and another gear face or a gear face and either of the legs 14, 15 and 19 and/or gear cover 22. Such a friction reduction means might be a separate part or might be molded, or affixed, directly onto the gear or the contact area of legs 14, 15, and 19 and/or gear cover 22. Similarly placed ball-bearings, roller bearings or other means might be used to reduce friction and might be a part of, or intermediary for, any of the gears, axis pivots, legs, or gear covers. The inventor contemplates all such friction reduction means.

Although specific embodiments of the invention have been described it should be recognized that additional modification and other alternate embodiments may be apparent to those skilled in the art.

The invention claimed is:

1. A multiple gear driver comprised of a first member having a first fixed gear means attached thereto and first rotatable gear means attached thereto,
   a second member having a second fixed gear means attached thereto and second rotatable gear means attached thereto,
   said first and second fixed gear means being located on a common axis wherein said first fixed gear means will drive said second rotatable gear means and said second fixed gear means will drive said first rotatable gear means when said first and second members are moved with respect to each other.

* * * * *